United States Patent
Dai et al.

(10) Patent No.: US 9,882,245 B2
(45) Date of Patent: Jan. 30, 2018

(54) ALKOXIDE-BASED MAGNESIUM ELECTROLYTE COMPOSITIONS FOR MAGNESIUM BATTERIES

(71) Applicant: UT-Battelle, LLC, Oak Ridge, TN (US)

(72) Inventors: Sheng Dai, Knoxville, TN (US); Xiao-Guang Sun, Knoxville, TN (US); Chen Liao, Oak Ridge, TN (US); Bingkun Guo, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 1196 days.

(21) Appl. No.: 13/974,566

(22) Filed: Aug. 23, 2013

(65) Prior Publication Data

US 2015/0056499 A1  Feb. 26, 2015

(51) Int. Cl.
| | | |
|---|---|---|
| *H01M 10/054* | (2010.01) | |
| *H01M 10/0568* | (2010.01) | |
| *H01M 4/38* | (2006.01) | |
| *H01M 4/46* | (2006.01) | |
| *H01M 4/58* | (2010.01) | |
| *H01M 10/0567* | (2010.01) | |

(52) U.S. Cl.
CPC ..... *H01M 10/0568* (2013.01); *H01M 10/054* (2013.01); *H01M 4/381* (2013.01); *H01M 4/46* (2013.01); *H01M 4/581* (2013.01); *H01M 10/0567* (2013.01); *H01M 2300/0025* (2013.01)

(58) Field of Classification Search
None
See application file for complete search history.

(56) References Cited

U.S. PATENT DOCUMENTS

| | | |
|---|---|---|
| 4,209,602 A | 6/1980 | Kuroda et al. |
| 4,727,051 A | 2/1988 | Breen et al. |
| 4,792,640 A | 12/1988 | Mehta |
| 4,820,879 A | 4/1989 | Mehta |

(Continued)

FOREIGN PATENT DOCUMENTS

| | | |
|---|---|---|
| WO | WO 01/09972 A1 | 2/2001 |
| WO | WO 2013/015369 A1 | 1/2013 |
| WO | WO 2013/096827 A1 | 6/2013 |

OTHER PUBLICATIONS

Aurbach D. et al., "Prototype Systems for Rechargeable Magnesium Batteries", *Nature* 407:724-727 (Oct. 12, 2000).

(Continued)

*Primary Examiner* — Barbara Gilliam
*Assistant Examiner* — Helen M McDermott
(74) *Attorney, Agent, or Firm* — Scully, Scott, Murphy & Presser, P.C.

(57) ABSTRACT

Alkoxide magnesium halide compounds having the formula:

$$\text{RO—Mg—X} \tag{1}$$

wherein R is a saturated or unsaturated hydrocarbon group that is unsubstituted, or alternatively, substituted with one or more heteroatom linkers and/or one or more heteroatom-containing groups comprising at least one heteroatom selected from fluorine, nitrogen, oxygen, sulfur, and silicon; and X is a halide atom. Also described are electrolyte compositions containing a compound of Formula (1) in a suitable polar aprotic or ionic solvent, as well as magnesium batteries in which such electrolytes are incorporated.

15 Claims, 10 Drawing Sheets

*n*-BuOMgCl   *tert*-BuOMgCl   Me₃SiOMgCl

PhOMgCl   BMP-MgCl

(56) References Cited

U.S. PATENT DOCUMENTS

| | | | |
|---|---|---|---|
| 5,081,320 | A | 1/1992 | Wang et al. |
| 5,108,972 | A | 4/1992 | Wang et al. |
| 5,852,216 | A | 12/1998 | Finkam et al. |
| 8,361,661 | B2 | 1/2013 | Doe et al. |
| 2008/0182176 | A1 | 7/2008 | Aurbach et al. |
| 2011/0159381 | A1* | 6/2011 | Doe ............... H01M 4/13 429/337 |
| 2013/0034780 | A1 | 2/2013 | Muldoon et al. |
| 2014/0141324 | A1* | 5/2014 | Chung ............ H01M 10/0568 429/200 |
| 2015/0140451 | A1* | 5/2015 | Yang ............... H01M 10/054 429/341 |

OTHER PUBLICATIONS

Aurbach D. et al., "Electrolyte Solutions for Rechargeable Magnesium Batteries Based on Organomagnesium Chloroaluminate Complexes", *Journal of The Electrochemical Society* 149(2):A115-A121 (2002).

Aurbach D. et al., "Nonaqueous Magnesium Electrochemistry and Its Application in Secondary Batteries", *The Chemical Record* 3:61-73 (2003).

Guo Y-S et al., "Boron-Based Electrolyte Solutions With Wide Electrochemical Windows for Rechargeable Magnesium Batteries", *Energy & Environmental Science* 5:9100-9106 (2012).

Kim H.S. et al., "Structure and Compatibility of a Magnesium Eletrolyte With a Sulphur Cathode", *Nature Communications* 2(427):1-6 (2011).

Lancry E. et al., "Molten Salt Synthesis (MSS) of $Cu_2Mo_6S_8$—New Way for Large-Scale Production of Chevrel Phases", *Journal of Solid State Chemistry* 179:1879-1882 (2006).

Lossius L.P. et al., "Plating of Magnesium from Organic Solvents", *Electrochimica Acta* 41(3):445-447 (1996).

Mizrahi O. et al., "Electrolyte Solutions With a Wide Electrochemical Window for Rechargeable Magnesium Batteries", *Journal of the Electrochemical Society* 155(2):A103-A109 (2008).

Muldoon J. et al., "Electrolyte Roadblocks to a Magnesium Rechargeable Battery", *Energy & Environmental Science* 5:5941-5950 (2012).

Nelson J.M. et al., "The Electromotive Force Developed in Cells Containing Nonaqueous Liquids", *Organic Laboratory, Columbia University, and the Harriman Research Laboratory* 288:82-83 (Oct. 25, 1916).

Wang F-F et al., "A Novel Electrolyte System Without a Grignard Reagent for Rechargeable Magnesium Batteries", *Chem. Communication* 48:10763-10765.

Yoo H.D. et al., "Mg Rechargeable Batteries: an On-Going Challenge", *Energy & Environmental Science* 6(8):2265-2279 (2013).

U.S. Pat. No. 8,361,661 B2, dated Jan. 29, 2013 to Doe et al.
U.S. Pat. No. 5,852,216, dated Dec. 22, 1998 to Finkam et al.
U.S. Pat. No. 5,108,972, dated Apr. 28, 1992 to Wang et al.
U.S. Pat. No. 5,081,320, dated Jan. 14, 1992 to Wang et al.
U.S. Pat. No. 4,820,879, dated Apr. 11, 1989 to Mehta.
U.S. Pat. No. 4,792,640, dated Dec. 20, 1988 to Mehta.
U.S. Pat. No. 4,727,051, dated Feb. 23, 1988 to Breen et al.
U.S. Pat. No. 4,209,602, dated Jun. 24, 1980 to Kuroda et al.
United States Patent Application Publication No. US 2013/0034780 A1, published Feb. 7, 2013 to Muldoon et al.
United States Patent Application Publication No. US 2008/0182176 A1, published Jul. 31, 2008 to Aurbach et al.
PCT International Publication No. WO 2013/096827 A1, published Jun. 27, 2013.
PCT International Publication No. WO 2013/015369 A1, published Jan. 31, 2013, together with an English-language abstract; and.
PCT International Publication No. WO 01/09972 A1, published Feb. 8, 2001.

Aurbach D. et al., "Nonaqueous Magnesium Electrochemistry and Its Application in Secondary Batteries",*The Chemical Record* 3:61-73 (2003).

Wang F-F et al., "A Novel Electrolyte System Without a Grignard Reagent for Rechargeable Magnesium Batteries", *Chem. Communication* 48:10763-10765 (2012).

\* cited by examiner

ALKOXIDE-BASED MAGNESIUM ELECTROLYTE COMPOSITIONS FOR MAGNESIUM BATTERIES

This invention was made with government support under Prime Contract No. DE-AC05-00OR22725 awarded by the U.S. Department of Energy. The government has certain rights in the invention.

FIELD OF THE INVENTION

The present invention relates generally to electrolyte compositions for magnesium batteries, and more particularly, to such compositions having a magnesium salt or complex included therein.

BACKGROUND OF THE INVENTION

Rechargeable batteries are essential components for consumer electronics, electric vehicle, and large grid energy storage. The state-of-the-art lithium ion batteries have high energy density and power density; however, their limitations lie in the high cost, low natural abundance of lithium, and safety issues related to dendrite formation. Efforts continue in the search for alternative electrode and electrolyte materials that are environmentally benign and of lower cost.

Magnesium is one of the most abundant elements on earth, and is an attractive electrode material with a high theoretical specific capacity of 2205 Ah/kg and a high theoretical energy density of 3800 mAh/g. Because of its two valence charges, Mg has a specific volumetric capacity of 3833 mAh/cc, higher than that of the lithium metal (2046 mAg/cc). Compared with lithium, magnesium metal is cheap and naturally abundant.

However, although rechargeable magnesium batteries have been studied for more than a decade, they are still facing several obstacles. First, the reactivity of magnesium toward electrolytes results in passivation of the magnesium surface. Unlike lithium ions, which can move through a solid electrolyte interface containing inorganic lithium salts (e.g., lithium carbonate and lithium fluoride), magnesium ions cannot pass such passivated films. Second, there is a need for safer and more efficient magnesium electrolytes.

Ether solutions of Grignard reagents allow reversible magnesium deposition/dissolution with a high coulombic efficiency. However, they have fairly low anodic stability with an electrochemical window less than 1.8 V (L. P. Lossius, et al., *Electrochim. Acta,* 41 (1996) 445-447). Typical Grignard reagents include those denoted by the formula RMgCl (where R=methyl, ethyl, butyl). By introducing a Lewis acid such as $AlCl_3$ or $AlCl_2Et$ to complex with the Grignard reagent, the electrochemical window of the resulting magnesium-Al electrolyte can be substantially increased. The current state-of-the-art intercalation electrode is $Mo_6S_8$, which is conventionally used in a THF solution of a Grignard reagent, $Mg(AlCl_2EtBu)_2$, to construct a rechargeable magnesium battery. The optimized $Mg(AlCl_2EtBu)_2$ electrolyte has an improved electrochemical stability up to 2.4 V vs $Mg/Mg^{2+}$ (D. Aurbach, et al., *Nature,* 407 (2000) 724-727). However, despite the 100% efficiency of deposition/dissolution toward the magnesium electrode, the $Mg(AlCl_2EtBu)_2$ electrolyte is highly flammable and has a relatively low solubility in THF solution. The large molecular weight of $Mg(AlCl_2EtBu)_2$ also makes it less attractive as an electrolyte.

SUMMARY OF THE INVENTION

In one aspect, the invention is directed to alkoxide magnesium halide compounds useful as electrolytes in a magnesium battery. The alkoxide magnesium halide compound has the following formula:

$$RO\text{—}Mg\text{—}X \quad (1)$$

In Formula (1), R is a saturated or unsaturated hydrocarbon group that is unsubstituted, or alternatively, substituted with one or more heteroatom linkers and/or one or more heteroatom-containing groups containing at least one heteroatom selected from fluorine, nitrogen, oxygen, sulfur, and silicon; X is a halide atom; and the bonds depicted between RO or X and Mg are understood to be predominantly ionic in nature.

In a first particular embodiment of Formula (1), the alkoxide magnesium halide compound has the formula:

(1a)

In Formula (1a), $R^1$, $R^2$, and $R^3$ can independently be selected from hydrogen atom (H) and any hydrocarbon group provided for R in Formula (1). In more particular embodiments, $R^1$, $R^2$, and $R^3$ can independently be selected from hydrogen atom and hydrocarbon groups R' having at least 1 and up to 12 carbon atoms, or more particularly, hydrogen atom and straight-chained and branched alkyl groups having at least 1 and up to 12 carbon atoms, wherein the hydrocarbon groups or alkyl groups may be substituted with one or more fluorine atoms.

In a second particular embodiment of Formula (1), the alkoxide magnesium halide compound has the formula:

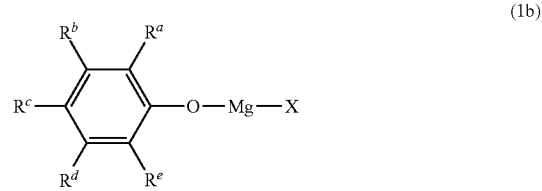

(1b)

In Formula (1b), $R^a$, $R^b$, $R^c$, $R^d$, and $R^e$ can independently be selected from hydrogen atom (H) and any hydrocarbon group provided for R in Formula (1). In more particular embodiments, $R^a$, $R^b$, $R^c$, $R^d$, and $R^e$ can independently be selected from hydrogen and straight-chained or branched alkyl groups, wherein the R hydrocarbon or alkyl group may be substituted or unsubstituted, as described above. In more particular embodiments, the R hydrocarbon groups have at least 1, 2, 3, 4, 5, or 6 carbon atoms, wherein the hydrocarbon groups may or may not be substituted with one or more fluorine atoms.

In a third particular embodiment of Formula (1), the alkoxide magnesium halide compound has the formula:

$$R^4R^5R^6SiO\text{—}Mg\text{—}X \quad (1c)$$

In Formula (1c), $R^4$, $R^5$, and $R^6$ are each bound to the silicon atom by a carbon atom and are independently selected from hydrocarbon groups R, or more particularly, hydrocarbon groups R' having at least 1 and up to 12 carbon atoms and is unsubstituted, or alternatively, substituted with one or more heteroatom linkers and/or one or more heteroatom-containing groups comprising at least one heteroatom selected from fluorine nitrogen, oxygen, sulfur, and silicon; and/or $R^4$, $R^5$, and $R^6$ are independently selected from groups OR or OR', wherein the Si atom is bound to the oxygen atom of OR or OR'; X is a halide atom; and the bonds depicted between $R^4R^5R^6SiO$ or X and Mg are understood to be predominantly ionic in nature.

In other aspects, the invention is directed to electrolyte compositions in which an alkoxide magnesium halide compound of Formula (1), (1a), or (1b) is dissolved in a polar aprotic or ionic liquid solvent non-reactive with components of the magnesium battery. In particular embodiments, the polar aprotic solvent includes at least one ether group.

In another aspect, the invention is directed to magnesium batteries in which any of the above alkoxide magnesium halide electrolyte compositions are incorporated. The magnesium battery includes (i) a negative electrode containing magnesium, (ii) a positive electrode suitable for a magnesium battery, and (iii) an alkoxide magnesium halide electrolyte composition described above. The invention is also directed to the operation of a magnesium battery in which any of the above alkoxide magnesium halide electrolyte compositions are incorporated.

The alkoxide magnesium halide electrolytes described herein have the significant advantages of being air-stable, non-pyrophoric, and non-flammable. The alkoxide magnesium halide electrolytes described herein are also advantageously highly soluble in a wide range of polar aprotic solvents that may be included as a component in the electrolyte. Moreover, by virtue of these advantageous properties, a magnesium battery containing these electrolytes can exhibit superior performance during its operation, including a high reversible capacity, superior cycling stability (e.g., maintaining a reversible capacity of at least 120 mAh/g even after at least 20 cycles), and superior rate performance.

BRIEF DESCRIPTION OF THE DRAWINGS

FIG. 3A: tert-BuOMgCl; n-BuOMgCl and Me$_3$SiOMgCl; FIG. 3B: (tert-BuOMgCl)$_6$—AlCl$_3$; (n-BuOMgCl)$_6$/AlCl$_3$ and (Me$_3$SiOMgCl)$_6$/AlCl$_3$.

(FIG. 9A) and 50° C. (FIG. 9C); typical discharge curves of the Mg—Mo$_6$S$_8$ cell in 1.0 M (tert-BuOMgCl)$_6$—AlCl$_3$/THF solution at different current rates at 20° C. (FIG. 9B) and 50° C. (FIG. 9D).

DETAILED DESCRIPTION OF THE INVENTION

Figure 1:
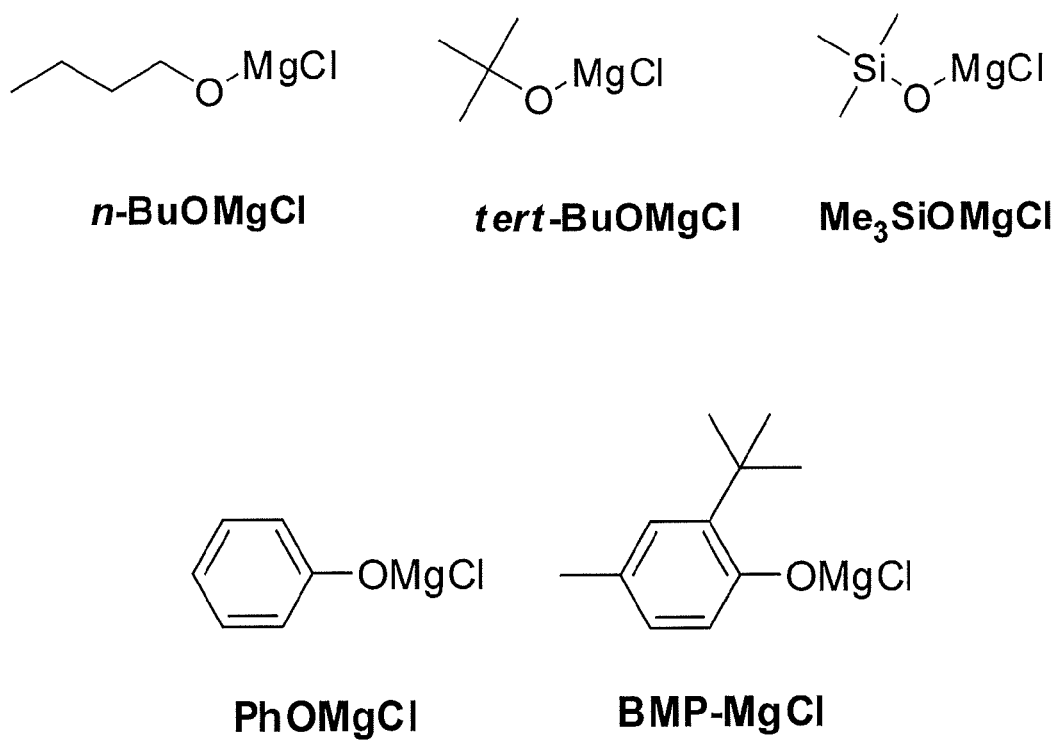
FIG. 1. Structures of selected alkoxide magnesium halide compounds of particular consideration herein as electrolytes. The chemical structures of n-BuOMgCl, tert-BuOMgCl, Me$_3$SiOMgCl, PhOMgCl, and BMP-MgCl magnesium electrolytes are shown, wherein Me=methyl, n-Bu=n-butyl, tert-Bu=tert-butyl, Ph=phenyl and BMP=2-tert-butyl-4-methylphenol.

As used herein, the term "about" generally indicates within ±0.5%, 1%, 2%, 5%, or up to ±10% of the indicated value. For example, an amount of "about 10 wt %" generally indicates, in its broadest sense, 10 wt %±10%, which indicates 9.0-11.0 wt %. The term "about" may alternatively indicate a variation or average in a physical characteristic of a group.

The term "hydrocarbon group" or "hydrocarbon linker" (also identified as "R"), as used herein, designates, in a first embodiment, groups or linkers composed solely of carbon and hydrogen. In different embodiments, one or more of the hydrocarbon groups or linkers can contain precisely, or a minimum of, or a maximum of, for example, one, two, three, four, five, six, seven, eight, nine, ten, eleven, or twelve carbon atoms, or a number of carbon atoms within a particular range bounded by any two of the foregoing carbon numbers. In some embodiments, the hydrocarbon group may include up to 20 or more carbon atoms. Hydrocarbon groups or linkers in different compounds described herein, or in different positions of a compound, may possess the same or different number (or preferred range thereof) of carbon atoms in order to independently adjust or optimize the activity or other characteristics of the compound.

The hydrocarbon groups or linkers can be, for example, saturated and straight-chained (i.e., straight-chained alkyl groups or alkylene linkers). Some examples of linear alkyl groups (or alkylene linkers) include methyl (or methylene linker, i.e., —CH$_2$—, or methine linker), ethyl (or ethylene or dimethylene linker, i.e., —CH$_2$CH$_2$— linker), n-propyl, n-butyl, n-pentyl, n-hexyl, n-heptyl, n-octyl, n-nonyl, n-decyl, n-undecyl, and n-dodecyl groups (or their respective linker analogs).

The hydrocarbon groups or linkers can alternatively be saturated and branched (i.e., branched alkyl groups or alkylene linkers). Some examples of branched alkyl groups include isopropyl(2-propyl), isobutyl(2-methylprop-1-yl), sec-butyl(2-butyl), t-butyl, 2-pentyl, 3-pentyl, 2-methylbut-1-yl, isopentyl(3-methylbut-1-yl), 1,2-dimethylprop-1-yl, 1,1-dimethylprop-1-yl, neopentyl(2,2-dimethylprop-1-yl), 2-hexyl, 3-hexyl, 2-methylpent-1-yl, 3-methylpent-1-yl, isohexyl(4-methylpent-1-yl), 1,1-dimethylbut-1-yl, 1,2-dimethylbut-1-yl, 2,2-dimethylbut-1-yl, 2,3-dimethylbut-1-yl, 3,3-dimethylbut-1-yl, 1,1,2-trimethylprop-1-yl, and 1,2,2-trimethylprop-1-yl groups, wherein the "1-yl" suffix represents the point of attachment of the group. Some examples of branched alkylene linkers are those derived by removal of a hydrogen atom from one of the foregoing exemplary branched alkyl groups (e.g., isopropylene, —CH(CH$_3$)CH$_2$—).

The hydrocarbon groups or linkers can alternatively be saturated and cyclic (i.e., cycloalkyl groups or cycloalkylene linkers). Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane). Some examples of cycloalkylene linkers are those derived by removal of a hydrogen atom from one of the foregoing exemplary cycloalkyl groups.

The hydrocarbon groups or linkers can alternatively be unsaturated and straight-chained (i.e., straight-chained olefinic or alkenyl groups or linkers). The unsaturation occurs by the presence of one or more carbon-carbon double bonds and/or one or more carbon-carbon triple bonds. Some examples of linear olefinic groups include vinyl, propen-1-yl(allyl), 3-buten-1-yl(CH$_2$=CH—CH$_2$—CH$_2$—), 2-buten-1-yl(CH$_2$—CH=CH—CH$_2$—), butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, and propargyl(2-propynyl). Some examples of straight-chained olefinic linkers are those derived by removal of a hydrogen atom from one of the foregoing exemplary straight-chained olefinic groups (e.g., vinylene, —CH=CH—, or vinylidene).

The hydrocarbon groups or linkers can alternatively be unsaturated and branched (i.e., branched olefinic or alkenyl groups or linkers). Some examples of branched olefinic groups include propen-2-yl(CH$_2$=C—CH$_3$), 1-buten-2-yl (CH$_2$=C—CH$_2$—CH$_3$), 1-buten-3-yl(CH$_2$=CH—CH—CH$_3$), 1-propen-2-methyl-3-yl(CH$_2$=C(CH$_3$)—CH$_2$), 1-penten-4-yl, 1-penten-3-yl, 1-penten-2-yl, 2-penten-2-yl, 2-penten-3-yl, 2-penten-4-yl, and 1,4-pentadien-3-yl. Some examples of branched olefinic linkers are those derived by removal of a hydrogen atom from one of the foregoing exemplary branched olefinic groups.

The hydrocarbon groups or linkers can alternatively be unsaturated and cyclic (i.e., cycloalkenyl groups or cycloalkenylene linkers). The unsaturated and cyclic group can be aromatic or aliphatic. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene. Some examples of cycloalkenylene linkers are those derived by removal of a hydrogen atom from one of the foregoing exemplary cycloalkenyl groups (e.g., phenylene and biphenylene).

One or more of the hydrocarbon groups or linkers may also include one or more heteroatoms (i.e., non-carbon and non-hydrogen atoms), such as one or more heteroatoms selected from oxygen, nitrogen, sulfur, silicon, and halide atoms, as well as groups containing one or more of these heteroatoms (i.e., heteroatom-containing groups). Some examples of oxygen-containing groups include hydroxy (OH), carbonyl-containing (e.g., carboxylic acid, ketone, aldehyde, carboxylic ester, amide, and urea functionalities), nitro (NO$_2$), carbon-oxygen-carbon (ether, or alkoxide group OR), sulfonyl, and sulfinyl (i.e., sulfoxide) groups. The ether group can also be a diether, triether, polyether, such as a polyalkyleneoxide group, such as a polyethyleneoxide group. Some particular examples of alkoxide groups —OR include methoxy, ethoxy, n-propoxy, isopropoxy, n-butoxy, isobutoxy, t-butoxy, phenoxy, benzyloxy, 2-hydroxyethoxy, 2-methoxyethoxy, 2-ethoxyethoxy, vinyloxy, and allyloxy groups. Some examples of nitrogen-containing groups include primary amine, secondary amine, tertiary amine, cyanide (i.e., nitrile), amide (i.e., —C(O)NR$_2$ or —NRC(O), wherein R is independently selected from hydrogen atom and hydrocarbon group, as described above), nitro, urea, imino, and carbamate. Some examples of sulfur-containing groups include mercapto (i.e., —SH), thioether (i.e., sulfide), disulfide, sulfoxide, sulfone, sulfonate, and sulfate groups. Some examples of halide atoms considered herein include fluorine, chlorine, and bromine. In particular embodiments, the hydrocarbon group is substituted with one or more fluorine atoms, which can result in a partially fluorinated species (e.g., —CHF$_2$, —CH$_2$F, —CH$_2$CF$_3$, —CH(CF$_3$)$_2$, or a fluoro-, difluoro-, trifluoro-, or tetrafluorophenyl group) or a perfluorinated species (e.g., —CF$_3$, —CF$_2$CF$_3$, —CF$_2$CF$_2$CF$_3$, —CF(CF$_3$)$_2$, or pentafluorophenyl, —C$_6$F$_5$). Some examples of silicon-containing groups include —Si(OR)$_3$, —SiR(OR)$_2$, —Si(OR)R$_2$, and —SiR$_3$ groups, while —SiR$_2$—, —SiR$_2$—O—, —Si(OR)$_2$—O— are examples of silicon-containing linkers. One or more of the heteroatoms described above (e.g., oxygen, nitrogen, and/or sulfur atoms) or heteroatom groups can be inserted between carbon atoms (e.g., as —O—, —NR—, —S—, —C(O)NR—) as a linker in any of the hydrocarbon groups described above. Alternatively, or in addition, one or more of the heteroatom-containing groups can replace one or more hydrogen atoms on the hydrocarbon group or linker. In some embodiments, any one or more generic classes or specific types of heteroatom-containing groups or linkers can be excluded from the hydrocarbon group.

In embodiments where the hydrocarbon group is or includes a cyclic group, the cyclic group may be, for example, monocyclic by containing a single ring without connection or fusion to another ring. The cyclic hydrocarbon group may alternatively be, for example, bicyclic, tricyclic, tetracyclic, or a higher polycyclic ring system by having at least two rings interconnected (i.e., by a bond) and/or fused.

In some embodiments, the cyclic hydrocarbon group is carbocyclic, i.e., does not contain ring heteroatoms (i.e., only ring carbon atoms). In different embodiments, ring carbon atoms in the carbocyclic group are all saturated, or a portion of the ring carbon atoms are unsaturated, or the ring carbon atoms are all unsaturated (as found in aromatic carbocyclic groups, which may be monocyclic, bicyclic, triclic, or higher polycyclic aromatic groups).

In some embodiments, the hydrocarbon group is, or includes, a cyclic or polycyclic group that includes at least one ring heteroatom (for example, one, two, three, four, or higher number of heteroatoms). Such ring heteroatom-substituted cyclic groups are referred to herein as "heterocyclic groups". As used herein, a "ring heteroatom" is an atom other than carbon and hydrogen (typically, selected from nitrogen, oxygen, and sulfur) that is inserted into, or replaces a ring carbon atom in, a hydrocarbon ring structure. In some embodiments, the heterocyclic group is saturated, while in other embodiments, the heterocyclic group is unsaturated (i.e., aliphatic or aromatic heterocyclic groups, wherein the aromatic heterocyclic group is also referred to herein as a "heteroaromatic ring", or a "heteroaromatic fused-ring system" in the case of at least two fused rings, at least one of which contains at least one ring heteroatom). In some embodiments, the heterocyclic group is bound via one of its ring carbon atoms to another group (i.e., other than hydrogen atom and adjacent ring atoms), while the one or more ring heteroatoms are not bound to another group. In other embodiments, the heterocyclic group is bound via one of its heteroatoms to another group, while ring carbon atoms may or may not be bound to another group.

Some examples of saturated heterocyclic groups include those containing at least one oxygen atom (e.g., oxetane, tetrahydrofuran, tetrahydropyran, 1,4-dioxane, 1,3-dioxane, and 1,3-dioxepane rings), those containing at least one nitrogen atom (e.g., pyrrolidine, piperidine, piperazine, imidazolidine, azepane, and decahydroquinoline rings), those containing at least one sulfur atom (e.g., tetrahydrothiophene, tetrahydrothiopyran, 1,4-dithiane, 1,3-dithiane, and 1,3-dithiolane rings), those containing at least one oxygen atom and at least one nitrogen atom (e.g., morpholine and oxazolidine rings), those containing at least one oxygen atom and at least one sulfur atom (e.g., 1,4-thioxane), and those containing at least one nitrogen atom and at least one sulfur atom (e.g., thiazolidine and thiamorpholine rings).

Some examples of unsaturated heterocyclic groups include those containing at least one oxygen atom (e.g., furan, pyran, 1,4-dioxin, and dibenzodioxin rings), those containing at least one nitrogen atom (e.g., pyrrole, imidazole, pyrazole, pyridine, pyrazine, pyrimidine, 1,3,5-triazine, azepine, diazepine, indole, purine, benzimidazole, indazole, 2,2'-bipyridine, quinoline, isoquinoline, phenanthroline, quinoxaline, quinazoline, pyridazine, and cinnoline), those containing at least one sulfur atom (e.g., thiophene, thianaphthene, and benzothiophene rings), those containing at least one oxygen atom and at least one nitrogen atom (e.g., oxazole, isoxazole, benzoxazole, benzisoxazole, and oxazoline rings), and those containing at least one nitrogen atom and at least one sulfur atom (e.g., thiazole, isothiazole, benzothiazole, benzoisothiazole, and thiazoline rings).

In a first aspect, the invention is directed to an alkoxide magnesium halide compound that can be used as or in an electrolyte in a magnesium battery. The term "alkoxide" or "alkoxy" used herein refers to any hydrocarbyloxy moiety of the formula OR, wherein R can be any of the hydrocarbon groups described above. The alkoxide magnesium halide compound has the following formula:

In Formula (1), R is a any of the saturated or unsaturated, straight-chained, branched, or cyclic hydrocarbon groups (R) described above, which may be substituted with one or more heteroatom linkers and/or one or more heteroatom-containing groups containing at least one heteroatom selected from fluorine, nitrogen, oxygen, sulfur, and silicon. In particular embodiments, the R hydrocarbon groups may have at least 1, 2, or 3 and up to 4, 5, 6, 7, 8, 9, 10, 11, or 12 carbon atoms. The substituent X is a halide atom. In the formula, the bonds depicted between RO and Mg or between X and Mg are understood to be predominantly ionic in nature since Mg is in the divalent ($Mg^{+2}$) state.

Moreover, the Formula (1) is representative of the minimum structural elements for the compound or material depicted therein. The actual compound, which may be structurally elucidated by, for example, x-ray crystallography, may include more than one OR group and/or more than one X group complexed with or associated with the Mg ion (in which one or more additional positively charged atoms are necessarily present to maintain charge neutrality), or the compound may or may not include one or more solvent molecules associated with the Mg ion, or the compound may or may not include more than one Mg ion associated with one or more OR groups and/or one or more X groups and/or one or more solvent molecules, all of which is encompassed by the Formula (1). Some examples of possible subformulas encompassed by Formula (1) include $Mg_2(OR)X_3$, $Mg_2(OR)_2X_2$, $Mg_2(OR)_3X$, $Mg_3(OR)X_5$, $Mg_3(OR)_2X_4$, $Mg_3(OR)_3X_3$, $Mg_3(OR)_4X_2$, and $Mg_3(OR)_5X$, wherein, in some embodiments, one or more magnesium atoms may be replaced with another bivalent metal atom (e.g., alkaline earth, such as Ca, Sr, or Ba, or a divalent transition metal, such as $Fe^{+2}$, $Co^{+2}$, $Ni^{+2}$, or $Cu^{+2}$) provided that at least one Mg atom remains; or one or more additional divalent, trivalent, tetravalent, pentavalent, or hexavalent metal ions (which may be main group or transition metal Lewis acid metals) may or may not be included in any of the foregoing formulas along with appropriate adjustment in stoichiometry for OR and X groups in order to maintain charge neutrality.

In a first set of particular embodiments of Formula (1), the alkoxide magnesium halide compound has the formula:

In Formula (1a), $R^1$, $R^2$, and $R^3$ are independently selected from hydrogen atom and saturated and unsaturated hydrocarbon groups R (and more particularly, straight-chained and branched alkyl groups), wherein the R hydrocarbon or alkyl group may be substituted or unsubstituted, as described above, and particularly, those R hydrocarbon groups having at least 1, 2, or 3 and up to 4, 5, 6, 7, 8, 9, 10, 11, or 12 carbon atoms (also designated herein as R'), and wherein the hydrocarbon groups may or may not be substituted with one or more fluorine atoms. In a first set of embodiments, all of $R^1$, $R^2$, and $R^3$ are hydrogen atoms, in which case the shown alkoxide group in Formula (1a) is a methoxy group. In a second set of embodiments, two of $R^1$, $R^2$, and $R^3$ are hydrogen atoms and one of $R^1$, $R^2$, and $R^3$ is a hydrocarbon group R, in which case the shown alkoxide group is a primary alkoxide group having at least two carbon atoms, such as ethoxy, n-propoxy, n-butoxy, isobutoxy (2-methylprop-1-yl-oxy), benzyloxy, allyloxy, and the like. In a third set of embodiments, one of $R^1$, $R^2$, and $R^3$ is a hydrogen atom and two of $R^1$, $R^2$, and $R^3$ are independently hydrocarbon groups R, in which case the shown alkoxide group is a secondary alkoxide group having at least three carbon atoms, such as isopropoxy (2-propoxy), 2-butoxy, 2-pentoxy, 3-pentoxy, 2-hexoxy, 3-hexoxy, 1,2-dimethyl-prop-1-yl, and the like. In a fourth set of embodiments, all of $R^1$, $R^2$, and $R^3$ are independently hydrocarbon groups R, in which case the shown alkoxide group is a tertiary alkoxide group having at least four carbon atoms, such as t-butoxy, 1,1-dimethylprop-1-yl-oxy, and 1,1-dimethylbut-1-yl-oxy, 1,1,2-trimethylprop-1-yl, and the like. In some embodiments, two of $R^1$, $R^2$, and $R^3$ can be combined or interconnected to form a double bond or ring structure, respectively, to result, for example, in a vinyloxy, allyloxy, cyclopentoxy, or cyclohexoxy group, or all three of $R^1$, $R^2$, and $R^3$ can be combined to form an unsaturated ring, to result, for example, in a phenoxy group. The bonds depicted between $R^1R^2R^3CO$ and Mg or between X and Mg are understood to be predominantly ionic in nature.

In a second set of particular embodiments of Formula (1), the alkoxide magnesium halide compound has the formula:

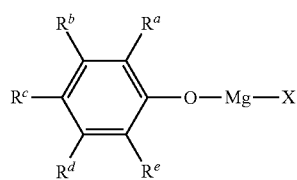

(1b)

In Formula (1b), $R^a$, $R^b$, $R^c$, $R^d$, and $R^e$ are independently selected from hydrogen atom, halide atom, hydroxy group (OH), and saturated and unsaturated hydrocarbon groups R (and more particularly, straight-chained and branched alkyl groups), wherein the R hydrocarbon or alkyl group may be substituted or unsubstituted, as described above, and particularly, those R hydrocarbon groups having at least 1, 2, 3, 4, 5, or 6 carbon atoms, and wherein the hydrocarbon groups may or may not be substituted with one or more fluorine atoms. In a first set of embodiments, all of $R^a$, $R^b$, $R^c$, $R^d$, and $R^e$ are hydrogen atoms, which results in an unsubstituted phenoxy group for the phenoxy group shown in Formula (1b). In a second set of embodiments, $R^a$, $R^b$, $R^c$, $R^d$, and $R^e$ are selected from hydrogen and fluorine atoms, which results in mono-, di-, tri-, tetra-, or penta-fluorinated phenoxy derivatives, e.g., 2-, 3-, or 4-fluorophenoxy; or 2,3-, 2,4-, 2,5-, 2,6-, 3,4-, or 3,5-difluorophenoxy; or 2,3,4-, 2,3,5-, 2,3,6-, or 3,4,5-trifluorophenoxy; or 2,3,4,5- or 2,3,5,6-tetrafluorophenoxy, or pentafluorophenoxy. In a third set of embodiments, $R^a$, $R^b$, $R^c$, $R^d$, and $R^e$ are selected from hydrogen atoms and methyl groups, which results in mono-, di-, tri-, tetra-, or penta-methylated phenoxy derivatives, e.g., 2-, 3-, or 4-methylphenoxy; or 2,3-, 2,4-, 2,5-, 2,6-, 3,4-, or 3,5-dimethylphenoxy; or 2,3,4-, 2,3,5-, 2,3,6-, or 3,4,5-trimethylphenoxy; or 2,3,4,5- or 2,3,5,6-tetramethylphenoxy. In any of the foregoing examples, one or more methyl groups may be replaced with, for example, halide, ethyl, n-propyl, isopropyl, n-butyl, sec-butyl, isobutyl, and t-butyl derivatives, which results in numerous other phenoxy derivatives. Moreover, any two or three of $R^a$, $R^b$, $R^c$, $R^d$, and $R^e$ may be interconnected to form one or two saturated or unsaturated rings fused to the phenyl ring shown in Formula (1b). A particular example of a fused phenoxy ring system is naphthoxy.

In a third set of particular embodiments of Formula (1), the alkoxide magnesium halide compound has the formula:

$R^4R^5R^6SiO-Mg-X$                (1c)

In Formula (1c), $R^4$, $R^5$, and $R^6$ are each bound to the silicon atom by a carbon atom and independently selected from saturated and unsaturated hydrocarbon groups R (and more particularly, straight-chained and branched alkyl groups), wherein the R hydrocarbon or alkyl group may be substituted or unsubstituted, as described above, and particularly, those R hydrocarbon groups having 1, 2, 3, 4, 5, 6, 7, 8, 9, 10, 11, or 12 carbon atoms or number of carbon atoms within a range bounded therein (also designated herein as R'), and wherein the hydrocarbon groups may or may not be substituted with one or more fluorine atoms. In Formula (1c), $R^4$, $R^5$, and $R^6$ can alternatively and independently be selected from groups OR or OR'. In a first set of embodiments, all of $R^4$, $R^5$, and $R^6$ independently selected from hydrocarbon groups R or R'. In a second set of embodiments, one or two of $R^4$, $R^5$, and $R^6$ are independently selected from OR or OR' groups with the remainder being R or R' groups. In a third set of embodiments, all of $R^4$, $R^5$, and $R^6$ are independently selected from OR or OR' groups. The shown siloxy $R^4R^5R^6SiO$ group may also include one or more additional Si atoms by including one or more Si atoms in any of $R^4$, $R^5$, and $R^6$. The resulting group could be, for example, a disilane, trisilane, disiloxane, or trisiloxane, or a cyclic version thereof (cyclosilane or cyclosiloxane). The bonds depicted between $R^4R^5R^6SiO$ and Mg or between X and Mg are understood to be predominantly ionic in nature.

In particular embodiments, any one or more of the hydrocarbon groups R, $R^1$, $R^2$, $R^3$, $R^4$, $R^5$, and $R^6$ under Formulas (1), (1a), and (1c) are unsubstituted straight-chained or branched alkyl groups, and particularly, those alkyl groups having 1, 2, 3, 4, 5, or 6 alkyl groups. Some examples of unsubstituted straight-chained or branched alkyl groups R, $R^1$, $R^2$, $R^3$, $R^4$, $R^5$, and $R^6$ within the scope of Formulas (1), (1a), or (1c) include methyl, ethyl, n-propyl, n-butyl, n-pentyl, n-hexyl, isopropyl(2-propyl), isobutyl(2-methylprop-1-yl), sec-butyl(2-butyl), t-butyl, 2-pentyl, 3-pentyl, 2-methylbut-1-yl, isopentyl(3-methylbut-1-yl), 1,2-dimethylprop-1-yl, 1,1-dimethylprop-1-yl, neopentyl(2,2-dimethylprop-1-yl), 2-hexyl, 3-hexyl, 2-methylpent-1-yl, 3-methylpent-1-yl, isohexyl(4-methylpent-1-yl), 1,1-dimethylbut-1-yl, 1,2-dimethylbut-1-yl, 2,2-dimethylbut-1-yl, 2,3-dimethylbut-1-yl, 3,3-dimethylbut-1-yl, 1,1,2-trimethylprop-1-yl, and 1,2,2-trimethylprop-1-yl groups.

In other particular embodiments, any one or more of the hydrocarbon groups R, $R^1$, $R^2$, $R^3$, $R^4$, $R^5$, and $R^6$ under Formulas (1), (1a), and (1c) are saturated or unsaturated cyclic hydrocarbon groups, or more particularly, monocyclic or bicyclic aryl or heteroaryl groups. In more specific embodiments, any one or more of the hydrocarbon groups R, $R^1$, $R^2$, $R^3$, $R^4$, $R^5$, and $R^6$ are phenyl-containing groups, such as any of the phenyl-containing groups described under Formula (1b).

In some embodiments, the alkoxide magnesium halide compound according to any of Formulas (1), (1a), (1b), or (1c) is complexed with a Lewis acid compound. The Lewis acid compound can be any of the Lewis acid compounds known in the art which generally include one or more electropositive atoms, such as one or more of aluminum, boron, iron, and titanium. In particular embodiments, the Lewis acid is selected from compounds having any of the formulae $AlX_3$, $BX_3$, $PX_3$, $AlX_2R^4$, $FeX_2$, $FeX_3$, $SbX_3$, and/or $TiX_4$, wherein X is independently selected from halogen atoms, and $R^4$ is a hydrocarbon group having 1 to 3 carbon atoms. Some more specific examples of Lewis acids include $AlCl_3$, $AlBr_3$, $AlF_3$, $AlI_3$, $AlCl_2(CH_3)$, $BF_3$, $BF_3$, $BCl_3$, $BBr_3$, $FeCl_3$, $FeCl_2$, $PCl_3$, $PF_3$, $SbCl_3$, $SbF_3$, and $TiCl_4$. In other embodiments, any one or more general or specific types of Lewis acid compounds or metals described above (or any Lewis acid compound or metal) are excluded from the composition.

The Lewis acid can be included in any suitable ratio with respect to the alkoxide magnesium halide. In different embodiments, the Lewis acid is included in a ratio of Lewis acid to alkoxide magnesium halide of precisely, about, at least, above, up to, or less than, for example, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, or 10:1, or a ratio within a range bounded by any two of the foregoing ratios. In particular embodiments, a ratio of at least 1:10, 1:9, 1:8, 1:7, 1:6, 1:5, 1:4, 1:3, or 1:2 of Lewis acid to alkoxide magnesium halide can advantageously increase the ionic conductivity, and may also enhance the oxidation potential higher than 2.5 V vs. Mg/Mg$^{2+}$ in a magnesium battery.

The alkoxide magnesium halide compounds described herein can be synthesized by any of several methods well known in the art, as described, for example, in U.S. Pat. Nos. 5,852,216, 5,108,972, 4,820,879, 4,792,640, 4,727,051, and 4,209,602, the contents of which are incorporated herein by reference in their entirety. For example, in some methods, a magnesium halide (e.g., magnesium chloride) is reacted with an alcohol (ROH) at an elevated temperature in either the presence or absence of magnesium metal. In particular embodiments, the alkoxide magnesium halide compound described herein is produced by reacting a hydrocarbyl magnesium halide (i.e., R—Mg—X, where R is typically an alkyl group, and more typically, an alkyl group having 1 to 4 carbon atoms) with an alcohol (ROH) to liberate a hydrocarbon (RH) with concomitant attachment of the alkoxide (—OR) onto Mg, wherein the R group in the alcohol reactant and R group on the hydrocarbyl magnesium halide reactant are independently selected. The reaction is summarized by the following equation:

ROH+RMgX→RO—Mg—X+RH

The above reaction is necessarily conducted under anhydrous conditions since any water is highly reactive with the hydrocarbyl magnesium halide reactant. Typically, the above reaction is exothermic; thus, heat is typically not applied during the process. In some embodiments, the reaction may be cooled to control the temperature during the reaction. The alcohol (ROH) can be any alcohol molecule in which any R group, described above, is derivatized with one or more OH groups. To produce the siloxane products shown for Formula (1c), the alcohol in the above equation is a silanol, in which the R group necessarily contains, at minimum, at least one silicon atom bound to the shown OH group. In some embodiments, ROH is a mono-alcohol, i.e., contains one OH group. In other embodiments, the ROH group is a diol (i.e., HO—R—OH), triol (i.e., R(OH)$_3$), or tetrol (i.e., R(OH)$_4$), wherein R can be any of the linker hydrocarbon groups described above. Some examples of mono-alcohols include methanol, ethanol, n-propanol, isopropanol, n-butanol, sec-butanol, isobutanol, t-butanol, n-pentanol, isopentanol, neopentyl alcohol, n-hexanol, isohexanol, phenol, 2-methyl-3-pentanol, 2,4-dimethyl-3-pentanol, 2,2-dimethyl-3-pentanol, 3-methyl-2-butanol, 3-methyl-2-pentanol, 4-methyl-3-hexanol, 3-methyl-2-hexanol, 3,4-dimethyl-2-hexanol, 2,4-dimethyl-3-heptanol, 4-methyl-3-heptanol, trimethylsilanol, and triethylsilanol. Some examples of diols include ethylene glycol, propylene glycol, 1,3-propanediol, 1,4-butanediol, 2,3-butanediol, 1,5-pentanediol, 2-methyl-2,4-pentanediol, as well as glycol ethers (e.g., diethylene glycol and triethylene glycol), cyclic diols (e.g., 1,2-cyclohexanediol, catechol, resorcinol, and 1,4-benzenediol), and disilanols (e.g., dimethylsilanediol). Some examples of triols include glycerol, 1,3,5-benzenetriol, trimethylolpropane, and methylsilanetriol. An example of a tetrol is pentaerythritol. The reaction of a diol with the hydrocarbyl magnesium halide can be summarized by the following equation:

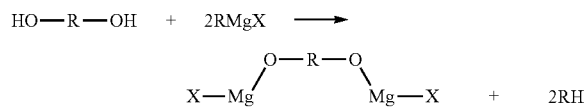

In the above equation, the magnesium product, as depicted, can take several other forms, many of which are fluxional with the depicted structure, such as

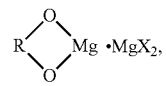

in which a magnesium dialkoxide species is complexed with a magnesium dihalide species.

Analogous reactions occur with triols and tetrols, with additional possible structures. The structures are within the scope of Formula (1) as long as the product contains both RO and X groups bound to Mg atoms in a 1:1:1 RO:Mg:X ratio. If a Lewis acid is desired to be included in the structure, a Lewis acid compound (e.g., AlCl$_3$) can be added during or after the reaction.

In some embodiments, one or more alkoxide magnesium halides of any of the formulas (1), (1a), (1b), or (1c) are dissolved in one or more polar aprotic solvents (i.e., "solvents"). The polar aprotic solvent can be, for example, ionic (e.g., an ionic liquid) or non-ionic. The one or more polar aprotic solvents are preferably non-reactive with the components of the magnesium battery, including the anode and the cathode, and furthermore, do not have a deleterious effect on the performance characteristics of the magnesium battery.

In some embodiments, the one or more polar aprotic solvents are non-ionic solvents. The non-ionic solvent typically has a melting point no more than or less than 100, 90, 80, 70, 60, or 50° C., and more typically, below room temperature, i.e., below about 25° C., and more typically, up to or less than 20, 15, 10, 5, or 0° C. The non-ionic solvent, which is typically also an polar aprotic solvent, can be, for example, a carbonate, sulfone, siloxane, silane, ether, ester, nitrile, sulfoxide, or amide solvent, or a mixture thereof.

Some examples of carbonate solvents include propylene carbonate (PC), ethylene carbonate (EC), butylene carbonate (BC), chloroethylene carbonate, fluorocarbonate solvents (e.g., fluoroethylene carbonate and trifluoromethyl propylene carbonate), as well as the dialkylcarbonate solvents, such as dimethyl carbonate (DMC), diethyl carbonate (DEC), dipropyl carbonate (DPC), ethyl methyl carbonate (EMC), methyl propyl carbonate (MPC), and ethyl propyl carbonate (EPC).

Some examples of sulfone solvents include methyl sulfone, ethyl methyl sulfone, methyl phenyl sulfone, methyl isopropyl sulfone (MIPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), diphenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methylsulfonyl)toluene, 2-(methylsulfonyl)ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl (methyl)sulfone and 2-methoxyethoxyethyl(ethyl)sulfone).

The polar aprotic solvent can also be silicon-containing, e.g., a siloxane or silane. Some examples of siloxane solvents include hexamethyldisiloxane (HMDS), 1,3-divinyltetramethyldisiloxane, the polysiloxanes, and polysiloxane-polyoxyalkylene derivatives. Some examples of silane solvents include methoxytrimethylsilane, ethoxytrimethylsilane, dimethoxydimethylsilane, methyltrimethoxysilane, and 2-(ethoxy)ethoxytrimethylsilane.

Other types of polar aprotic solvents include ether, ester, nitrile, sulfoxide, and amide solvents. Some examples of ether solvents include diethyl ether, 1,2-dimethoxyethane, 1,2-diethoxyethane, 1,3-dioxolane, tetrahydrofuran, 2-methyltetrahydrofuran, tetrahydropyran, diglyme, triglyme, 1,3-dioxolane, and the fluorinated ethers (e.g., mono-, di-, tri-, tetra-, penta-, hexa- and per-fluoro derivatives of any of the foregoing ethers). Some examples of ester solvents include 1,4-butyrolactone, ethylacetate, methylpropionate, ethylpropionate, propylpropionate, methylbutyrate, ethylbutyrate, the formates (e.g., methyl formate, ethyl formate, or propyl formate), and the fluorinated esters (e.g., mono-, di-, tri-, tetra-, penta-, hexa- and per-fluoro derivatives of any of the foregoing esters). Some examples of nitrile solvents include acetonitrile, propionitrile, and butyronitrile. Some examples of sulfoxide solvents include dimethyl sulfoxide, ethyl methyl sulfoxide, diethyl sulfoxide, methyl propyl sulfoxide, and ethyl propyl sulfoxide. Some examples of amide solvents include formamide, N,N-dimethylformamide, N,N-diethylformamide, acetamide, dimethylacetamide, diethylacetamide, gamma-butyrolactam, and N-methylpyrrolidone. The polar aprotic solvent may also be, for example, an organochloride (e.g., methylene chloride, chloroform, 1,1,-trichloroethane), ketone (e.g., acetone, 2-butanone), organoethers (e.g., diethyl ether, tetrahydrofuran, and dioxane), hexamethylphosphoramide (HMPA), N-methylpyrrolidinone (NMP), 1,3-dimethyl-3,4,5,6-tetrahydro-2(1H)-pyrimidinone (DMPU), and propylene glycol monomethyl ether acetate (PGMEA).

In some embodiments, the one or more solvents contain at least one or more oxyether (i.e., carbon-oxygen-carbon) groups. The one or more solvents can be ether solvents, i.e., polar aprotic solvents formulated as hydrocarbons except that they contain one or more carbon-oxygen-carbon groups (e.g., one, two, three, four, five, or six C—O—C groups) in the absence of any other chemical groups. The ether solvents typically contain at least three, four, five, six, seven, or eight carbon atoms, and up to nine, ten, eleven, twelve, or higher number of carbon atoms, and can be acyclic or cyclic. The ether solvent may also be saturated, or alternatively, unsaturated (i.e., by the presence of one or more carbon-carbon double or triple bonds).

Some examples of acyclic ether solvents containing one oxygen atom include diethyl ether, di(n-propyl)ether, diisopropyl ether, diisobutyl ether, methyl(t-butyl)ether, and anisole. Some examples of acyclic ether solvents containing two or more oxygen atoms include ethylene glycol dimethyl ether (i.e., dimethoxyethane, or DME, or glyme), diethylene glycol dimethyl ether (diglyme), triethylene glycol dimethyl ether (triglyme), and tetraethylene glycol dimethyl ether (tetraglyme). The foregoing exemplary acyclic ether solvents all contain methyl groups as endcapping groups. However, any hydrocarbon endcapping groups are suitable. Some common endcapping groups aside from methyl groups include, allyl, vinyl, n-propyl, isopropyl, n-butyl, isobutyl, sec-butyl, and t-butyl groups.

In some embodiments, the electrolyte includes at least one solvent that is an aprotic ether solvent that has a tendency to polymerize, particularly in the presence of a halide (as provided, for example, when a halide-containing additive is included). Particularly preferred in this respect are the cyclic ethers. The polymerization of these solvents during cycling in the presence of a halide-containing additive may improve the cycling performance of the magnesium battery. Some examples of cyclic ether solvents include 2,3-epoxybutane (i.e., 2,3-dimethyloxirane), oxetane, tetrahydrofuran (THF), furan, tetrahydropyran, pyran, 1,3-dioxolane, 1,3-dioxane, 1,4-dioxane, 1,3,5-trioxane, and the crown ethers.

In some embodiments, the electrolyte medium further includes a non-polar solvent. Some examples of non-polar solvents include the liquid hydrocarbons, such as the pentanes, hexanes, heptanes, octanes, pentenes, hexenes, heptenes, octenes, benzene, toluenes, or xylenes. In another embodiment, non-polar solvents are excluded from the electrolyte medium.

In some embodiments, an ionic liquid may be included in the electrolyte. The ionic liquid can be denoted by the formula $Y^+X^-$, wherein $Y^+$ is a cationic component of the ionic liquid and $X^-$ is an anionic component of the ionic liquid. The formula $(Y^+)(X^-)$ is meant to encompass a cationic component $(Y^+)$ having any valency of positive charge, and an anionic component $(X^-)$ having any valency of negative charge, provided that the charge contributions from the cationic portion and anionic portion are counterbalanced in order for charge neutrality to be preserved in the ionic liquid molecule. More specifically, the formula $(Y^+)(X^-)$ is meant to encompass the more generic formula $(Y^{+a})_y(X^{-b})_x$, wherein the variables a and b are, independently, non-zero integers, and the subscript variables x and y are, independently, non-zero integers, such that a.y=b.x (wherein the period placed between variables indicates multiplication of the variables).

The ionic liquid compound is typically a liquid at room temperature (e.g., 15, 18, 20, 22, 25, or 30° C.) or lower. However, in some embodiments, the ionic liquid may become a liquid at a higher temperature than 30° C. if it is used at an elevated temperature that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C.

In various embodiments, the cationic portion $(Y^+)$ of the ionic liquid $Y^+X^-$ is selected from imidazolium, pyridinium, pyrazinium, pyrrolidinium, piperidinium, piperazinium, morpholinium, pyrrolium, pyrazolium, pyrimidinium, triazolium, oxazolium, thiazolium, and triazinium rings, as well as quaternary ammonium, phosphonium, sulfonium, and cyclic and acyclic guanidinium rings. The counteranion $(X^-)$ of the ionic liquid can be any of the counteranions well known in the art. In some embodiments, the counteranion is inorganic by not including any C—C, C—H, or C—F bonds, such as a halide (e.g., $F^-$, $Cl^-$, $Br^-$, or $I^-$), $PCl_6^-$, $PF_6^-$, perchlorate, chlorate, chlorite, cyanate, isocyanate, thiocyanate, isothiocyanate, perbromate, bromate, bromite, periodate, iodate, dicyanamide (i.e., $N(CN)_2^-$), tricyanamide (i.e., $N(CN)_3^-$), nitrate, nitrite, carbonate, bicarbonate, sulfate, sulfite, hydrogensulfate, hydrogensulfite, phosphate, hydrogenphosphate ($HPO_4^{2-}$), and dihydrogenphosphate ($H_2PO_4^-$). In other embodiments, the counteranion is carbon-containing (i.e., organic) by containing at least one C—C, C—H, or C—F bond, such as the carboxylates (e.g., formate, acetate, propionate, butyrate, valerate, lactate, pyruvate, oxalate, malonate, glutarate, adipate, decanoate, salicylate, ibuprofenate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, docusate, and the like), the alkoxides (e.g., methoxide, ethoxide, isopropoxide, phenoxide, and glycolate), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In some embodiments, any one or more classes or specific types of polar aprotic solvents and/or ionic liquids are excluded from the electrolyte. In other embodiments, a combination of two or more polar aprotic solvents or a combination of two or more ionic liquids are included in the electrolyte.

The alkoxide magnesium halide compound can be included in the electrolyte in any suitable amount. In different embodiments, the alkoxide magnesium halide compound is included in an amount of precisely, about, at least, above, up to, or less than, for example, 0.1, 0.5, 1, 2, 3, 4, 5, 10, 15, 20, 25, 30, 35, 40, 45, 50, 60, 70, 80, 90, 95, 98, or 100 wt % by weight of the electrolyte, or an amount within a range bounded by any two of the foregoing exemplary values. Alternatively, the polar aprotic solvent and/or ionic liquid may be included in any of the foregoing amounts in the electrolyte.

In some embodiments, the electrolyte further includes one or more halide-containing additives (i.e., "halide additives"). The halide additive can be any halide-containing ionic compound or material (i.e., a salt). The halide considered herein can be, for example, fluoride ($F^-$), chloride ($Cl^-$), bromide ($Br^-$), or iodide ($I^-$), or a combination thereof. The countercation can be any inorganic or organic countercation. The inorganic countercation is typically either an alkali (i.e., Group I, e.g., monovalent Li, Na, K, or Rb) or alkaline earth (i.e., Group II, e.g., monovalent Be, Mg, Ca, Sr, or Ba) metal cation. However, boron-group (i.e., Group III), nitrogen-group (i.e., Group V, e.g., organic or inorganic ammonium ions), and transition-metal cations are also considered herein, as long as the halide compound or material is not corrosive or otherwise deleterious to any component of the magnesium battery. The halide additive is preferably completely soluble in the electrolyte. The halide additive can be, for example, one or more lithium halides (e.g., LiF, LiCl, LiBr, LiI), sodium halides (e.g., NaF, NaCl, NaBr, NaI), potassium halides (e.g., KF, KCl, KBr, KI), rubidium halides (e.g., RbF, RbCl, RbBr, RbI), magnesium halides (e.g., $MgF_2$, $MgCl_2$, $MgBr_2$, $MgI_2$), calcium halides (e.g., $CaF_2$, $CaCl_2$, $CaBr_2$, $CaI_2$), strontium halides (e.g., $SrF_2$, $SrCl_2$, $SrBr_2$, $SrI_2$), barium halides (e.g., $BaF_2$, $BaCl_2$, $BaBr_2$, $BaI_2$), Group III halides (e.g., $BF_3$, $BCl_3$, $AlF_3$, $AlCl_3$, $TlF$, $TlCl$, and related compounds or complexes), Group IV halides (e.g., $SiCl_4$, $SnCl_2$, $SnCl_4$), Group V halides (e.g., $PCl_3$, $AsCl_3$, $SbCl_3$, $SbCl_5$), transition-metal halides (e.g., $TiCl_4$, $ZnCl_2$), rare-earth halides (e.g., $LaF_3$, $LaCl_3$, $CeF_3$, $CeCl_3$), inorganic ammonium halides (e.g., $NH_4F$, $NH_4Cl$, $NH_4Br$, $NH_4I$), organic ammonium halides (e.g., $MeNH_3Cl$, $Me_2NH_2Cl$, $Me_3NHCl$, $Me_4NCl$, $Et_4NCl$, $Bu_4NF$, $Bu_4NBr$, where Me is methyl, Et is ethyl, and Bu is n-butyl), or a combination of any of these. In other embodiments, one or more of the foregoing groups or specific types of halide additives are excluded from the electrolyte.

Generally, the halide-containing additive is present in the electrolyte medium in at least a trace amount (e.g., at least 0.001 M or 0.001 m, where "M" indicates a molarity concentration and "m" indicates a molality concentration). In different embodiments, the halide additive is present in a minimum amount of, for example, 0.01 M, 0.05 M, 0.1 M, 0.2 M, 0.3 M, 0.4 M, 0.5 M, 0.6 M, 0.7 M, 0.8 M, 0.9 M, 1.0 M, 1.1 M, 1.2 M, 1.3 M, 1.4 M, or 1.5 M. In other embodiments, the halide additive is present in a maximum amount of, for example, 0.5 M, 0.6 M, 0.7 M, 0.8 M, 0.9 M, 1.0 M, 1.1 M, 1.2 M, 1.3 M, 1.4 M, 1.5 M, 1.6 M, 1.7 M, 1.8 M, 2.0 M, 2.1 M, 2.2 M, 2.3 M, 2.4 M, or 2.5 M. In other embodiments, the halide additive is present in an amount within a range bounded by any combination of minimum and maximum values given above, provided that the minimum value is less than the maximum value. Any of the concentrations given above in terms of molarity (M) can alternatively be understood to be molality (m) concentrations. Moreover, any of the concentrations provided above can alternatively and independently be taken as the concentration of the alkoxide magnesium halide compound in the electrolytem, either in the absence or presence of a halide-containing additive.

In another aspect, the invention is directed to a magnesium battery containing any of the electrolyte compositions described above. The magnesium battery may contain any of the components typically found in a magnesium battery, including cathode (positive) and anode (negative) electrodes, current collecting plates, and a battery shell, such as described in, for example, U.S. Pat. No. 8,361,661, U.S. Application Pub. Nos. 2013/0034780 and 2008/0182176, and PCT Publication WO2013/096827, the contents of which are incorporated herein by reference in their entirety.

The positive electrode can include, as an active material, for example, a transition metal oxide or transition metal sulfide material. As used herein, the term "transition metal" refers to any of the metals in Group 3 (scandium group), Group 4 (titanium group), Group 5 (vanadium group), Group 6 (chromium group), Group 7 (manganese group), Group 8 (iron group), Group 9 (cobalt group), Group 10 (nickel group), Group 11 (copper group), and Group 12 (zinc group), or to a specific selection thereof or therein. Some examples of transition metal oxide materials include $MnO_2$, $V_2O_5$, $MgV_2O_5$, $MgMnSiO_4$, $MgNiMnO_4$, $Mg_2MnO_4$, $MgFe_2(PO_4)_2$, $TiP_2O_7$, $VP_2O_7$, and $MoO_3$. Some examples of transition metal sulfide materials include $Mo_6S_8$, $CuS$, $Cu_2S$, $Ag_2S$, $CrS_2$, $TiS_2$, $MoS_2$, $CuCr_2S_4$, $MgCr_2S_4$, and $Mo_3S_4$ Chevrel phase.

In particular embodiments, the positive electrode has the general formula $M_xMo_6T_8$, wherein M is at least one metal selected from alkaline earth and transition metals, T is selected from at least one of sulfur, selenium, and tellurium, and x is a value of 0 to 2. In some embodiments, T is only one of sulfur, selenium, or tellurium, while in other embodiments, T is a combination of at least two of sulfur, selenium, and tellurium, particularly where T includes at least sulfur (e.g., S and Se, or S and Te), such as in the sub-formula $Mo_6S_{8-y}Se_y$, wherein y is a number of 0 to 8, or above 0 and up to or less than 0.5, 1, 2, 3, or 4. In particular embodiments, M is selected from Mg, Cu, Ni, and Ag, or a combination thereof. Some examples of compositions within the $M_xMo_6T_8$ formula include $Mo_6S_8$, $Mo_6Se_8$, $Mo_6Te_8$, $Mo_6S_4Se_4$, $Mg_{0.2}Mo_6S_8$, $Mg_{0.5}Mo_6S_8$, $Mg_{0.8}Mo_6S_8$, $MgMo_6S_8$, $Mg_{1.2}Mo_6S_8$, $Mg_{1.5}Mo_6S_8$, $Mg_{1.8}Mo_6S_8$, and $Mg_2Mo_6S_8$, wherein Mg in the foregoing examples can be replaced with or be in combination with any one or more other alkaline earth and/or transition metal (e.g., $Cu_{0.8}Mo_6S_8$, $Mg_{0.8}Cu_{0.2}Mo_6S_8$, $Mg_{1.5}Cu_{0.5}Mo_6S_8$, $NiMo_6S_8$, $Ni_2Mo_6S_8$, $AgMo_6S_8$, $Ag_2Mo_6S_8$, and $VMo_6S_8$).

The negative electrode is generally a magnesium-containing electrode, which may include magnesium in elemental or divalent form. In elemental form, the magnesium may be either in the absence of other metals (i.e., substantially or completely pure magnesium, except for a possible trace of other metals, e.g., up to 1, 0.5, or 0.1 wt %) or in the form of a magnesium alloy, e.g., AZ31, AZ61, AZ63, AZ80, AZ81, ZK51, ZK60, ZC63, or the like. In some embodiments, the negative electrode can be or include a magnesium intercalation material, which may, before operation, not yet include magnesium intercalated therein. Some examples of magnesium intercalation materials include any of the materials described above for the positive electrode, anatase or rutile $TiO_2$, $FeS_2$, $TiS_2$, or $MoS_2$.

The positive and negative electrodes are typically affixed onto current collectors, as well known in the art. The current collectors can be, for example, a carbonaceous material or a stainless steel. In typical embodiments, one or both of the anode or cathode materials are admixed with a suitable polymeric binder, such as polyvinylidene fluoride (PVdF), polytetrafluoroethylene, or the like. One or both of the anode or cathode materials may also be admixed with a conductive additive, such as carbon black, acetylene black, graphite flakes, carbon nanotubes, buckminsterfullerenes, carbon foam, or carbon nanofibers.

The magnesium battery may also include a solid porous membrane positioned between the negative and positive electrodes. The solid porous membrane can be composed of, for example, a plastic or polymeric material (e.g., polyethylene, polypropylene, or copolymer thereof) or an inorganic material, such as a transition metal oxide (e.g., titania, zirconia, yttria, hafnia, or niobia) or main group metal oxide, such as silicon oxide, which can be in the form of glass fiber.

In yet another aspect, the invention is directed to a method of operating a magnesium battery that contains any of the electrolyte compositions and components described above. The operation of magnesium batteries is well known in the art. The magnesium battery described herein can advantageously be successfully cycled at 50° C. or a higher temperature, and cycled at rates ranging from 0.1 coulombs (C) to 2 C with reversible capacities of at least 80, 90, 100, 110, 120, 130, 140, or 150 mAh/g under a rate of 0.1, 0.2, 0.5, 1, 1.5, or 2 C at a temperature of at least 20, 30, 40, 50, or 60° C. The magnesium battery described herein preferably displays a high reversible capacity, superior cycling stability (e.g., maintaining a reversible capacity of at least 100, 110, 120, 130, or 150 mAh/g even after at least 10, 20, 30, 40, or 50 cycles), and superior rate performance Examples have been set forth below for the purpose of illustration and to describe certain specific embodiments of the invention. However, the scope of this invention is not to be in any way limited by the examples set forth herein.

Examples

Preparation and Analysis of Alkoxide Magnesium Halide Compositions

Preparative Procedure and Conditions

Anhydrous n-butanol, tert-butanol, and trimethylsilanol were commercially obtained and used as received. 2.0 M THF solutions of ethylmagnesium chloride and butylmagnesium chloride were used for supplying the hydrocarbyl magnesium halide reactant. All reactions were conducted in an Ar-filled glovebox with both oxygen and moisture level below 0.5 ppm.

The ROMgCl salts were synthesized under the same or similar conditions. For example, to synthesize n-BuOMgCl, 296 mg of anhydrous n-butanol was slowly added to 2 mL of 2.0 M THF solution of butylmagnesium chloride in an Ar-filled glove box. The reaction was extremely exothermic and released a large amount of gas as butane. After the reaction was finished and cooled, an appropriate amount of solid $AlCl_3$ was added to the solution under stirring. For the phenol-based magnesium salts, phenol (PhOH) or 2-tert-butyl-4-methylphenol (BMP) were used as the alcohol reactant to prepare the electrolyte of PhOMgCl or BMP-MgCl, respectively.

Five magnesium salts, n-BuOMgCl, tert-BuOMgCl, $Me_3SiOMgCl$, PhOMgCl, and BMP-MgCl, were synthesized and characterized as air-stable electrolytes (where Me=methyl, n-Bu=n-butyl, tert-Bu=t-butyl, Ph=phenyl, and BMP=2-tert-butyl-4-methylphenol). The structures of these compositions are shown in FIG. 1. These alkoxide-based electrolytes are non-pyrophoric, have high solubility, high ionic conductivity, and a wide electrochemical window. The structures and reaction mechanisms of the electrolytes, as well as excellent electrochemical reversibility during battery cycling in $Mg-Mo_6S_8$ batteries at both 20 and 50° C. were herein systematically investigated. The anodic stability of the two most sterically-hindered electrolytes (tert-BuOMgCl and $Me_3SiOMgCl$) can be extended to ~2.5 V vs. $Mg/Mg^{2+}$ upon addition of a Lewis acid, $AlCl_3$. These alkoxide-containing salts surpass both amine-based magnesium and Grignard electrolytes in terms of anodic stability, since oxygen is more electronegative than both the nitrogen and the carbon. The reaction schemes and structures of the alkoxide-based magnesium electrolytes were also studied and analyzed by single-crystal XRD.

Figure 2:
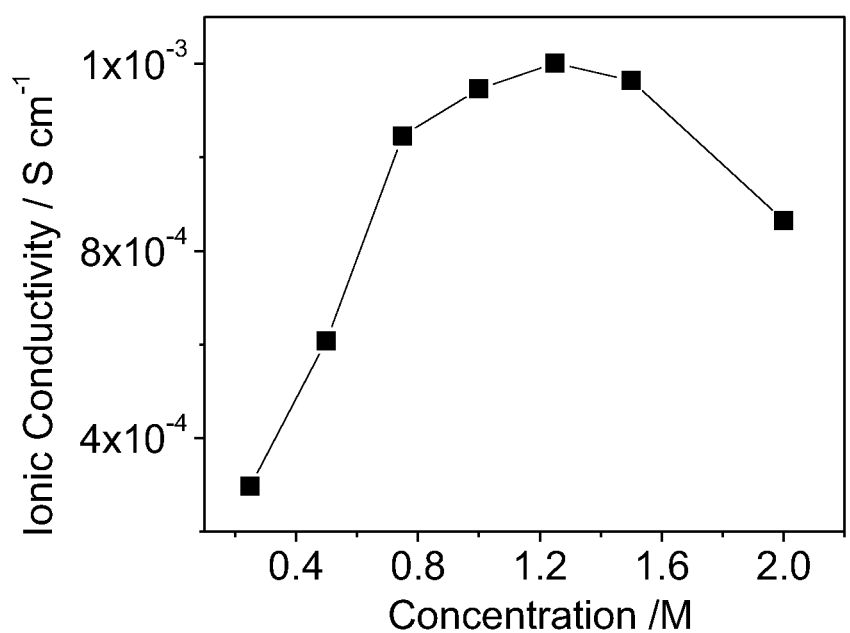
FIG. 2. Graph plotting the ionic conductivity of a THF solution of tert-BuOMgCl measured as a function of molar salt concentration at 20° C.

Solubility and Ionic Conductivity Experiments for the Alkoxide Magnesium Halides The concentration effect on the ionic conductivity of the alkoxide-based magnesium electrolytes was studied. These alkoxide-based magnesium electrolytes displayed high solubility in THF, with a maximum solubility in THF reaching 2.0 M. An aqueous solution of 0.1 M KCl was used as a reference to calibrate the house-made ionic conductivity cell. As shown in FIG. 2, the ionic conductivity of the THF solution of tert-BuOMgCl was measured as a function of salt concentration at 20° C. The ionic conductivity reaches a maximum of 1.20 mS/cm at a salt concentration of 1.2 M. Similar experiments were conducted for the THF solution of n-BuOMgCl. The maximum ionic conductivity for the THF solution of n-BuOMgCl is observed as 1.27 mS/cm at 1.5 M concentration. Surprisingly, as compared with the THF solutions of tert-BuOMgCl and n-BuOMgCl, a one-order magnitude decrease in ionic conductivity was observed for the THF solution of $Me_3SiOMgCl$, with the maximum of 0.19 mS/cm at a concentration of 0.5 M.

The PhOMgCl salt has a solubility of less than 0.75 M in THF, while BMP-MgCl is not soluble above 1 M. The phenol-based magnesium electrolytes studied herein have a much lower ionic conductivity and solubility, with a maximum ionic conductivity of 0.161 mS/cm observed for 1.0 M BMP-MgCl/THF solution.

The alkoxide-based magnesium electrolytes studied herein have an advantage in terms of their small molecular weight. In particular, the molecular weight ($M_w$=134) for n-BuOMgCl and tert-BuOMgCl is much lower than that of conventional $Mg(AlCl_2EtBu)_2$ ($M_w$=392), and lower than that of BMP-MgCl ($M_w$=222). The small molecular weight of the alkoxide magnesium electrolytes considered in this study may be at least partly responsible their superior solubility and ionic conductivity.

The addition of a Lewis acid (e.g., $AlCl_3$) to the magnesium electrolyte can be used to improve the electrochemical window. Based on the present results, after the addition of $AlCl_3$, not only the electrochemical window, but also the ionic conductivity of the resulting magnesium-Al electrolyte is improved as compared to the magnesium electrolyte alone. For example, the ionic conductivity of 1.0 M solution of $(tert-BuOMgCl)_6$—$AlCl_3$/THF is observed to be 1.33 mS/cm, which is slightly increased compared to the ionic conductivity of 1.0 M tert-BuOMgCl/THF ($\sigma$=1.15 mS/cm). A more dramatic increase was observed for the phenol-based magnesium electrolyte: upon addition of $AlCl_3$ to the THF solution of BMP-MgCl at a ratio of 1:2 ($AlCl_3$: BMP-MgCl), the ionic conductivity of the resulting (BMP-MgCl)$_2$—$AlCl_3$/THF solution was increased to 2.1 mS/cm at a concentration of 0.5 M, which is an approximately 20-fold increase compared to the ionic conductivity of 0.5 M THF solution of BMP-MgCl ($\sigma$=0.1 mS/cm). The latter result suggests that different ionic conducting species are formed upon the addition of $AlCl_3$, and as discussed later, the new species were identified as the $AlCl_4^-$ anion, as elucidated by single crystal XRD.

Electrochemical Characterization and Performance of Alkoxide Magnesium Halides

The electrochemical window and reversibility of the Mg deposition/dissolution of the magnesium electrolytes were studied using cyclic voltammetry. Cyclic voltammograms (CVs) of three-electrode cells were conducted at room temperature. The working electrode was a Pt disk. Magnesium ribbon served as counter and reference electrodes. All of the electrodes were polished with a corundum suspension and rinsed with dry acetone before use.

The batteries were assembled as 2032-type coin cells inside an argon-filled glovebox by using $Mo_6S_8$ as the cathode electrode, magnesium metal as the anode electrode, and glass fiber membrane as a separator. The cells were assembled in a glovebox containing less than 1 ppm water and $O_2$. During this experiment, a constant deposition current density of 0.1 mA cm$^{-2}$ was passed through the cell for 1 hour, and then the same dissolution current density was applied until a cut-off voltage of 0.5 V vs. Mg.

For the positive electrode (cathode), $Mo_6S_8$ was prepared by the molten salt method (E. Lancry, et al., *J. Solid State Chem.*, 2006, 179, 1879-1882). The electrode was prepared by applying a mixture of as-synthesized $Mo_6S_8$, acetylene black, and PTFE (weight-ratio: 80:10:10) onto a stainless steel mesh. The loading of active material was between 3.0 and 5.0 mg. Galvanostatic discharge-charge experiments were tested in the voltage range of 0.2-2.0 V on an Arbin® battery test system at different temperatures.

Figure 3A:
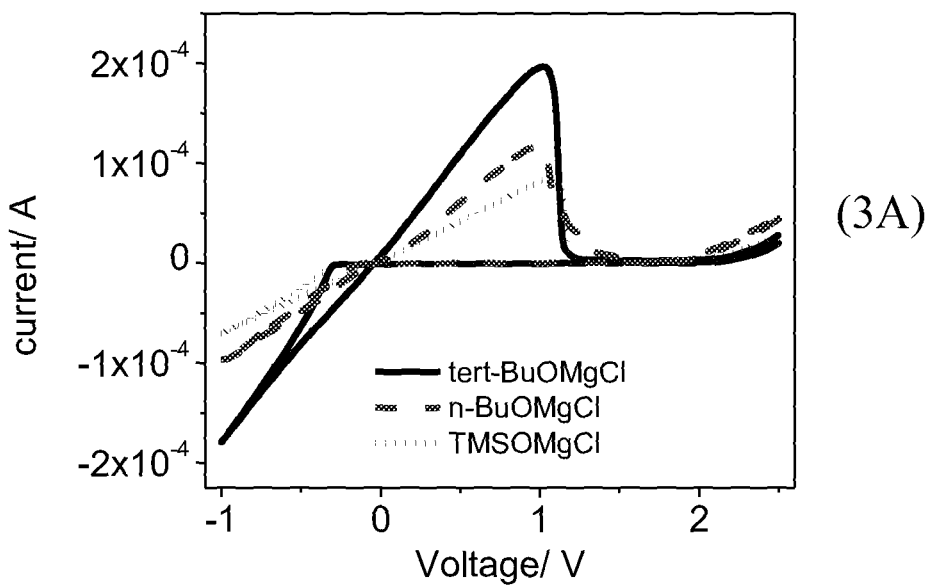
FIGS. 3A, 3B. Typical cyclic voltammetric (CV) curves for 1.0 M THF solutions of different electrolyte solutions on Pt working electrodes at a scan rate of 100 mV/s.
Figure 3B:
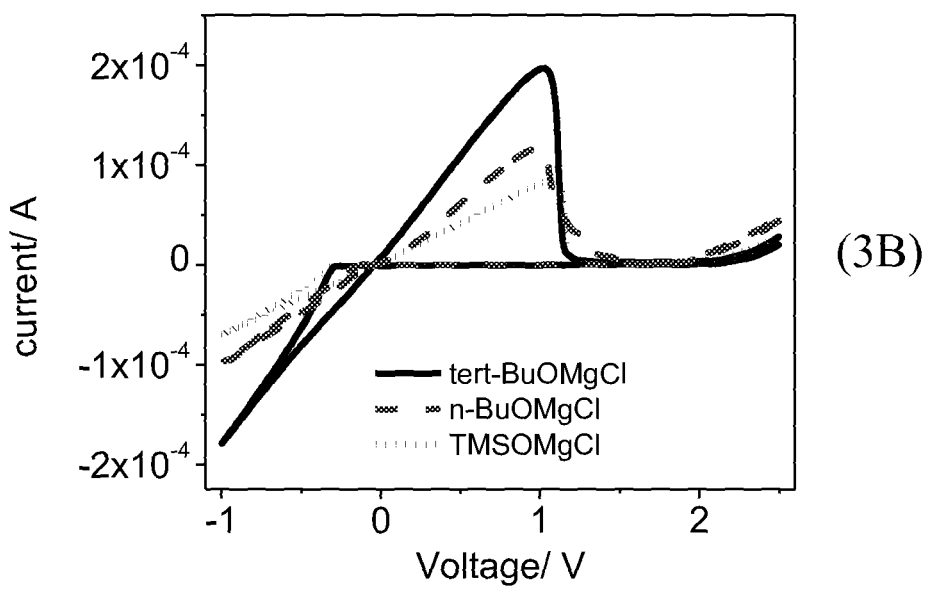

A comparison was made for the magnesium electrolytes alone and in presence of $AlCl_3$. FIG. 3A shows the cyclic voltammograms of 1.0 M THF solutions of tert-BuOMgCl, n-BuOMgCl, and $Me_3SiOMgCl$ without $AlCl_3$ on a Pt working electrode at a scan rate of 100 mV/s. All of these alkoxide-based magnesium electrolytes display reversible Mg deposition/dissolution. The anodic stability follows the order, tert-BuOMgCl>$Me_3SiOMgCl$>n-BuOMgCl. Since the absence of passivating surface films is a requirement for the reversible Mg deposition and resolution, all these electrolytes do not passivate the surface of fresh deposited magnesium. Upon addition of $AlCl_3$, the electrochemical window of the alkoxide-based magnesium electrolytes was improved. FIG. 3B shows the cyclic voltammograms of 1.0 M THF solutions of the resulting (tert-BuOMgCl)$_6$—$AlCl_3$/THF, (n-BuOMgCl)$_6$—$AlCl_3$/THF, and ($Me_3SiOMgCl$)$_6$—$AlCl_3$/THF on a Pt working electrode. The THF solutions of both (tert-BuOMgCl)$_6$—$AlCl_3$ and ($Me_3SiOMgCl$)$_6$—$AlCl_3$/THF exceed a voltage of 2.5 V and the anodic stability still follows the order (tert-BuOMgCl)$_6$—$AlCl_3$/THF>($Me_3SiOMgCl$)$_6$—$AlCl_3$/THF>(n-BuOMgCl)$_6$—$AlCl_3$/THF. The disadvantage of $AlCl_3$ addition to the magnesium electrolyte is the decrease of solubility. The addition of $AlCl_3$ to the magnesium electrolyte solution can cause immediate precipitation because of the poor solubility of the resulting Al-magnesium electrolyte. For the instant alkoxide-based magnesium electrolytes, the ratio of $AlCl_3$: ROMgCl is ideally lower than 1:6 to ensure high solubility of the Al-magnesium electrolyte in THF at greater than 1.0 M.

Figure 6:
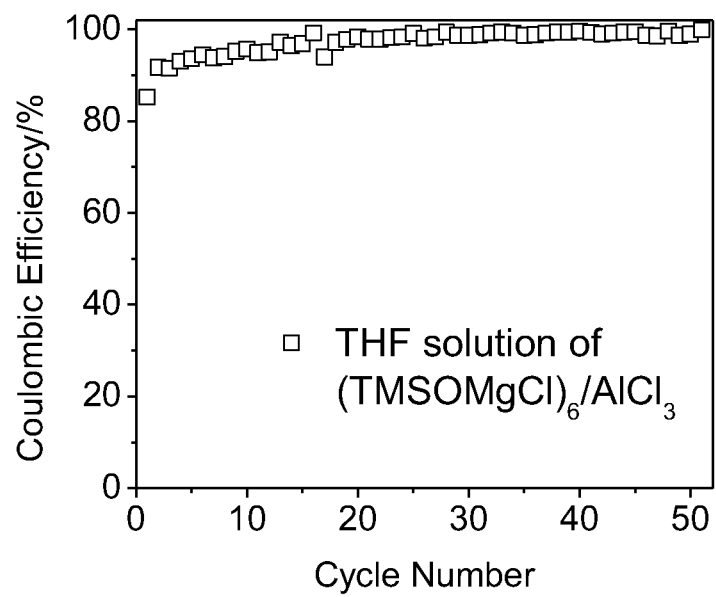
FIG. 6. The cycling efficiencies and the first 10 chronopotentiograms of Mg deposition and dissolution on Cu in 1.0 M (n-BuOMgCl)$_6$—AlCl$_3$/THF electrolyte.
Figure 7:
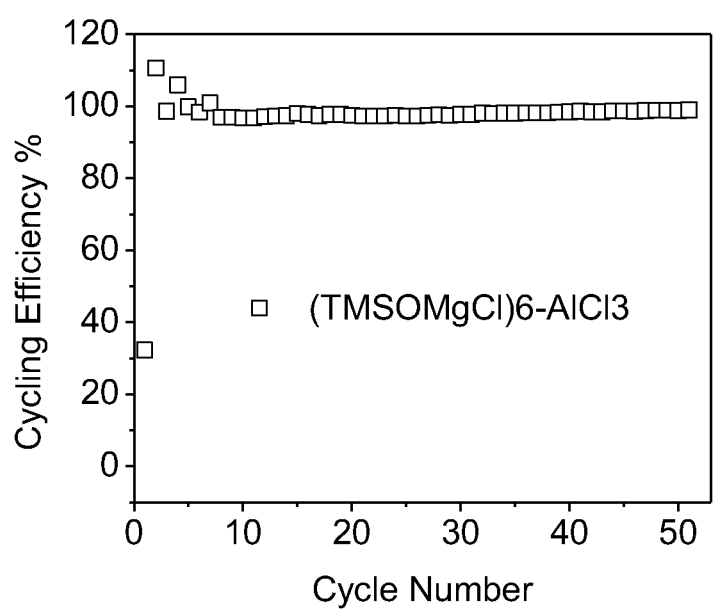
FIG. 7. Cycling efficiencies of Mg deposition and dissolution on Cu in 1.0 M (Me$_3$SiOMgCl)$_6$—AlCl$_3$/THF electrolyte.
Figure 8:
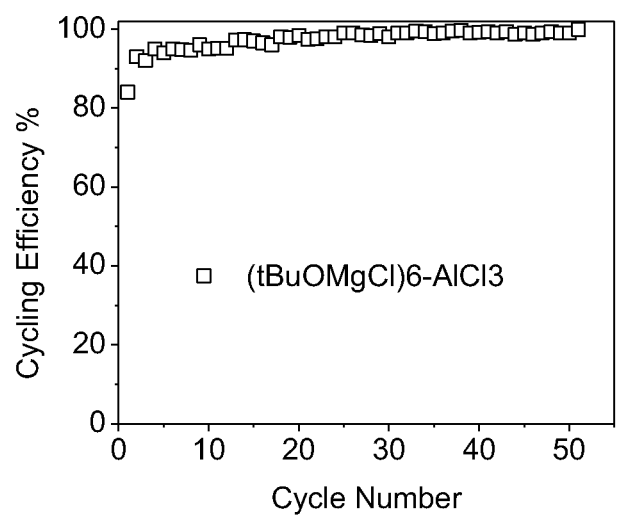
FIG. 8. Cycling efficiencies of Mg deposition and dissolution on Cu in 1.0 M (tert-BuOMgCl)$_6$—AlCl$_3$/THF electrolyte.

These alkoxide-based magnesium electrolytes also show high coulombic efficiency with excellent reversible magnesium deposition and dissolution, as evaluated via chronopotentiometry for the 1.0 M THF solutions of (tert-BuOMgCl)$_6$—$AlCl_3$, (n-BuOMgCl)$_6$—$AlCl_3$ and ($Me_3SiOMgCl$)$_6$—$AlCl_3$ using cells. As shown in the coulombic efficiency vs. cycle number graph of FIG. 6, at the beginning of the deposition/dissolution cycles the coulombic efficiency of the THF solution of (n-BuOMgCl)$_6$—$AlCl_3$ is 85%. After five cycles, the efficiencies increase to 95%. The coulombic efficiencies of (tert-BuOMgCl)$_6$—$AlCl_3$ and ($Me_3SiOMgCl$)$_6$—$AlCl_3$ also increases above 95% after 5 cycles, as shown in the plot of cycling efficiency vs. cycle number provided in FIGS. 7 and 8.

Figure 9A:
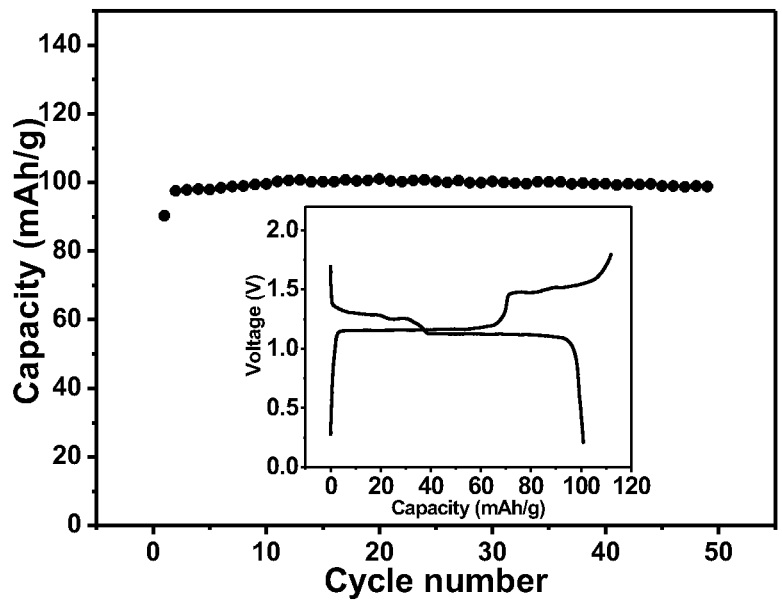
FIGS. 9A-9D. Galvanostatic discharge/charge curves and cycling performance of the Mg—Mo$_6$S$_8$ cell under a current rate of 0.1 C in 1.0 M (tert-BuOMgCl)$_6$—AlCl$_3$/THF solution at 20° C.
Figure 9B:
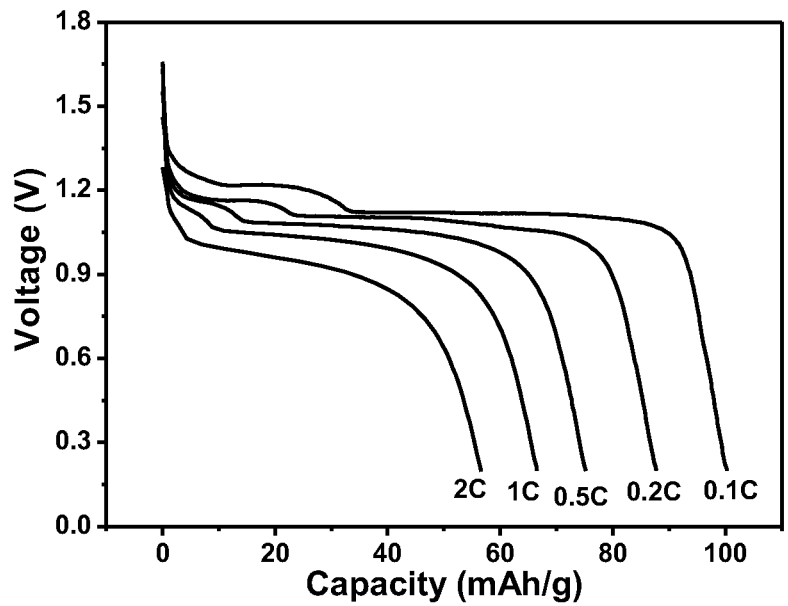
Figure 9C:
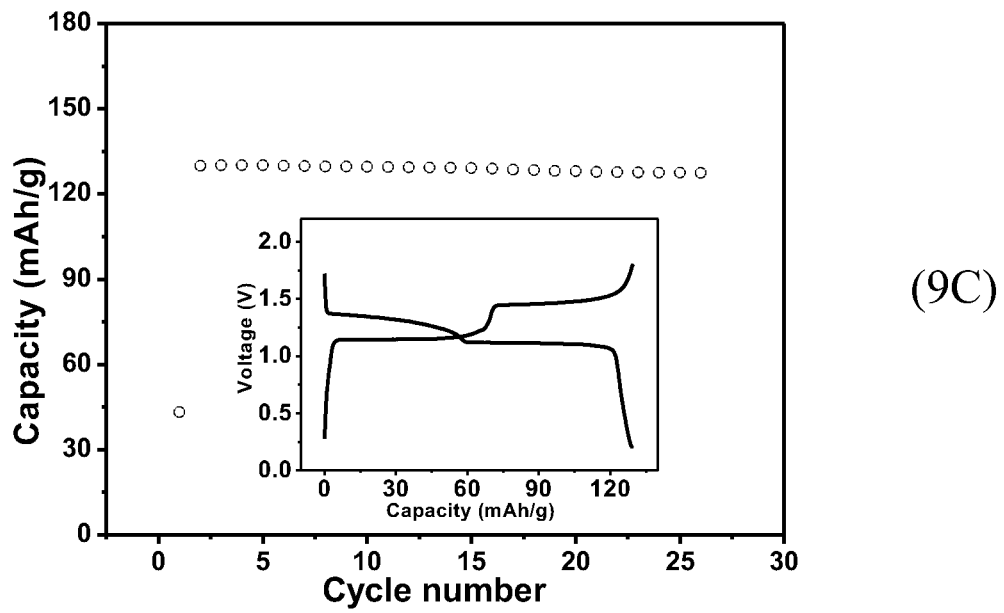
Figure 9D:
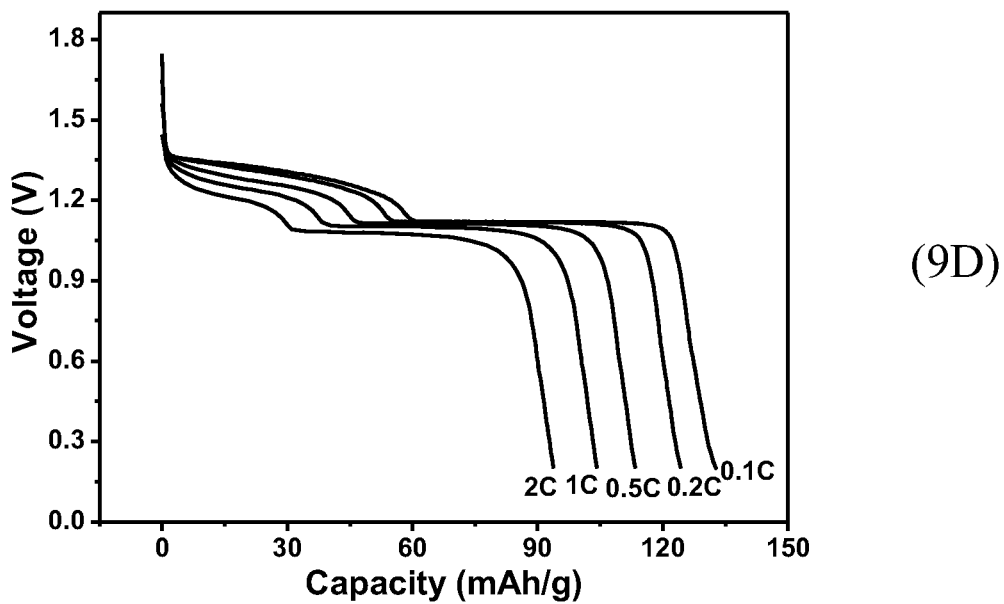

Thus far, Chevrel phase $Mo_6S_8$ is the only cathode material showing reversible magnesium intercalation with a very small fading capacity during thousands of cycles. Therefore, in this report, $Mo_6S_8$ was used to evaluate the reversibility of these alkoxide-based magnesium electrolytes via galvanostatic discharge—charge experiments. The inset in FIG. 9A shows the typical discharge—charge curves of the Mg—$Mo_6S_8$ cell at a current rate of 0.1 C using a 1.0 M THF solution of (tert-BuOMgCl)$_6$—$AlCl_3$ at 20° C. As shown in the galvanostatic discharge/charge and cycling performance curves in FIG. 9A, the $Mo_6S_8$ electrode exhibits a reversible discharge capacity of 100 mAh/g and there is no capacity loss observed even after 50 cycles, indicating that the alkoxide-based magnesium electrolyte can be successfully used in rechargeable Mg batteries. As shown in the voltage vs. capacity discharge curves in FIG. 9B, the Mg—$Mo_6S_8$ cell with (tert-BuOMgCl)$_6$—$AlCl_3$/THF electrolyte also shows very good rate performance at 20° C. For example, the specific discharge capacity of the cell is as high as 75 mAh/g at 0.5 C and 56 mAh/g at 2 C. Because of the improved safety of the alkoxy based electrolytes comparing to the Mg($AlCl_2EtBu$)$_2$, the battery was also tested at 50° C. As shown in the galvanostatic discharge/charge and cycling performance curves of FIG. 9C, the $Mo_6S_8$ electrode exhibits a reversible capacity of 130 mAh/g at 50° C., which is much higher than that at 20° C. and is close to the theoretical capacity of $Mo_6S_8$. The foregoing results indicate that the slow kinetics of $Mo_6S_8$ limits the electrochemical properties of the cell at 20° C. Besides a high reversible capacity, the cell also exhibits an excellent cycling stability at 50° C., i.e. the capacity is still as high as 127 mAh/g even after 27 cycles (FIG. 9C). In addition, as shown in the voltage vs. capacity discharge curves of FIG. 9D, $Mo_6S_8$ shows an excellent rate performance at 50° C. For instance, the specific discharge capacity of $Mo_6S_8$ is as high as 113.4 mAh/g at 0.5 C and 93.9 mAh/g at 2 C. A comparison of FIGS. 9B and 9D reveals that the rate performance at 50° C. was significantly higher than that at 20° C. due to the improved electrode kinetics.

Structural Analysis

Single-crystal X-ray data were collected at 173 K on a Bruker® SMART APEX CCD diffractometer with finefocus Mo K$\alpha$ radiation ($\lambda$=0.71073 Å), operated at 50 kV and 30 mA. The structure was solved using the direct methods and was refined on F2 using the SHELXTL® 6.12 software package (Bruker AXS). Absorption corrections were applied using the program SADABS. Hydrogen atoms were placed in idealized positions and refined using a riding model.

Figure 4:
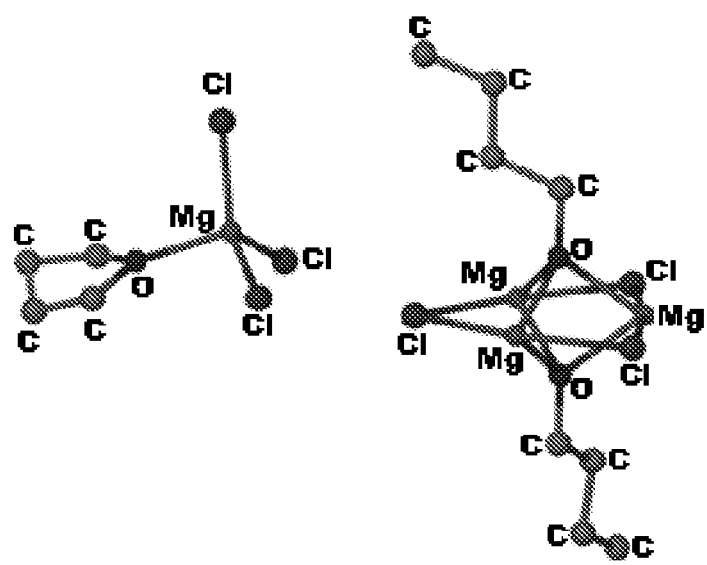
FIG. 4. X-ray crystal structure of a single crystal of [Mg$_3$Cl$_3$(n-BuO)$_2$(THF)$_6$]$^+$ [(THF)MgCl$_3$]$^-$ grown from a THF solution of (n-BuOMgCl)$_6$/AlCl$_3$. Hydrogen atoms and THF in the structure are omitted for clarity.

Single crystals of n-BuOMgCl were grown from the THF solution of (n-BuOMgCl)$_6$/AlCl$_3$, and the structure is shown in FIG. 4. As shown, the composition has a molecular formula of [Mg$_3$Cl$_3$(OC$_4$H$_9$)$_2$(THF)$_6$]$^+$[(THF)MgCl$_3$]$^-$. Because of the active role of the C$_4$H$_9$O$^-$ alkoxide serving as a ligand (each C$_4$H$_9$O$^-$ is complexing with three bridging Mg atoms), the structure is different from the previously reported [Mg$_2$Cl$_3$(THF)$_6$]$^+$[C$_2$H$_5$AlCl$_3$]$^-$ or the [Mg$_2$Cl$_3$(THF)$_6$]$^+$[HMDSAlCl$_3$]$^-$ (Energy Environ. Sci., 2012, 5, 5941-5950). The cation, [Mg$_3$Cl$_3$(OC$_4$H$_9$)$_2$(THF)$_6$]$^+$, consists of three octahedrally coordinated Mg centers. Each of the three chlorides coordinates with two Mg atoms while each of the two butoxides (C$_4$H$_9$O$^-$) coordinates with three Mg centers. Each Mg center is coordinated by two THF molecules, which are omitted in FIG. 4 for clarity. Similar to previous reports that [Mg$_2$Cl$_3$(THF)$_6$]$^+$[C$_2$H$_5$AlCl$_3$]$^-$ is electrochemically inactive (O. Mizrahi, et al., J. Electrochem. Soc., 2008, 155, A103-A109), the [Mg$_3$Cl$_3$(OC$_4$H$_9$)$_2$(THF)$_6$]$^+$[(THF)MgCl$_3$]$^-$ composition was also observed herein to be electrochemically inactive.

The formation of the crystal can be explained by Equations 1-4, shown below:

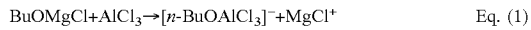

BuOMgCl+AlCl$_3$→[n-BuOAlCl$_3$]$^-$+MgCl$^+$  Eq. (1)

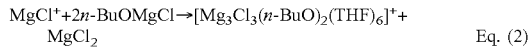

MgCl$^+$+2n-BuOMgCl→[Mg$_3$Cl$_3$(n-BuO)$_2$(THF)$_6$]$^+$+ MgCl$_2$  Eq. (2)

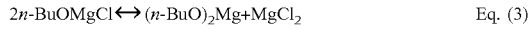

2n-BuOMgCl ↔ (n-BuO)$_2$Mg+MgCl$_2$  Eq. (3)

Cl$^-$+MgCl$_2$→MgCl$_3^-$  Eq. (4)

The reaction between chloride anion and MgCl$_2$ gives the desired anion, MgCl$_3^-$, while the resulting MgCl$^+$ reacts with two n-BuOMgCl to form the observed cations, [Mg$_3$Cl$_3$(n-BuO)$_2$(THF)$_6$]$^+$ and MgCl$_2$ (Eq. 2). This is believed to be the first direct complexing reaction reported between RMgCl (R=n-BuO$^-$) and MgCl$^+$, although further research is in progress to determine which factors determine the complexing ability. The Schlenk equilibrium (Eq. (3)) is a well-known reaction in the Grignard chemistry, and has been confirmed by $^1$H NMR (W. Schlenk; W. Schlenk, Jr., (1929), Chem. Ber., 62 (4): 920). Despite the preference of magnesium to be hexacoordinated, the anion is observed to be tetracoordinated [(THF)MgCl$_3$]$^-$ in the single crystal (Eq. (4)).

Figure 5:
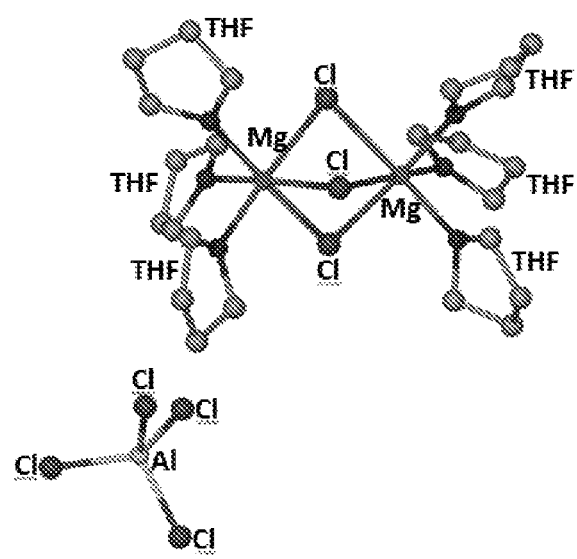
FIG. 5. X-ray crystal structure of a single crystal of [Mg$_2$Cl$_3$(THF)$_6$]$^+$[AlCl$_4$]$^-$ grown from a THF solution of (BMP-MgCl)$_2$/AlCl$_3$. Hydrogen atoms and THF in the structure are omitted for clarity.

The single crystal of (BMP-MgCl)$_2$—AlCl$_3$ was also grown from the THF solution and the structure was elucidated as [Mg$_2$Cl$_3$(THF)$_6$]$^+$[AlCl$_4$]$^-$ (FIG. 5). Clearly, the complexing ability of BMP-MgCl is not as strong as that of n-BuOMgCl; therefore, only [Mg$_2$Cl$_3$(THF)$_6$]$^+$ instead of [Mg$_3$Cl$_3$(BMP)$_2$(THF)$_6$]$^+$ was formed in the single crystal. With respect to the crystal structure in FIG. 5, the low crystal quality did not permit an ideal refinement. However, the identity and structural connectivity of the ions could be determined unambiguously, and revealed this structure.

While there have been shown and described what are at present considered the preferred embodiments of the invention, those skilled in the art may make various changes and modifications which remain within the scope of the invention defined by the appended claims.

What is claimed is:

1. A magnesium battery comprising:
   (i) a negative electrode comprising magnesium;
   (ii) a positive electrode; and
   (iii) an electrolyte positioned between the negative and positive electrodes, the electrolyte comprising a compound of the formula:

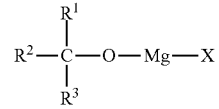

(1a)

wherein R$^1$, R$^2$, and R$^3$ are independently selected from hydrogen atom and saturated and unsaturated hydrocarbon groups having at least 1 and up to 12 carbon atoms, wherein said hydrocarbon groups are optionally substituted with one or more fluorine atoms; X is a halide atom; and the bonds depicted between RO or X and Mg are understood to be predominantly ionic in nature.

2. The magnesium battery of claim 1, wherein said negative electrode comprises elemental magnesium.

3. The magnesium battery of claim 1, wherein said positive electrode is comprised of a transition metal oxide or transition metal sulfide material.

4. The magnesium battery of claim 1, wherein said positive electrode is comprised of a material of the formula M$_x$Mo$_6$T$_8$, wherein M is at least one metal selected from alkaline earth and transition metals, T is selected from at least one of sulfur, selenium, and tellurium, and x is a value of 0 to 2.

5. The magnesium battery of claim 4, wherein T comprises at least sulfur.

6. The magnesium battery of claim 4, wherein M is selected from Mg, Cu, Ni, and Ag.

7. The magnesium battery of claim 1, wherein R$^1$, R$^2$, and R$^3$ are independently selected from hydrogen atom and saturated and unsaturated hydrocarbon groups having at least 1 and up to 6 carbon atoms, wherein said hydrocarbon groups may be substituted with one or more fluorine atoms.

8. The magnesium battery of claim 1, wherein R$^1$, R$^2$, and R$^3$ are independently selected from hydrogen atom and unsubstituted straight-chained and branched alkyl groups.

9. The magnesium battery of claim 8, wherein said unsubstituted straight-chained or branched alkyl group is selected from methyl, ethyl, n-propyl, n-butyl, n-pentyl, n-hexyl, isopropyl, isobutyl, sec-butyl, t-butyl, 2-pentyl, 3-pentyl, 2-methylbut-1-yl, isopentyl, 1,2-dimethylprop-1-yl, 1,1-dimethylprop-1-yl, neopentyl, 2-hexyl, 3-hexyl, 2-methylpent-1-yl, 3-methylpent-1-yl, isohexyl, 1,1-dimethylbut-1-yl, 1,2-dimethylbut-1-yl, 2,2-dimethylbut-1-yl, 2,3-dimethylbut-1-yl, 3,3-dimethylbut-1-yl, 1,1,2-trimethylprop-1-yl, and 1,2,2-trimethylprop-1-yl groups.

10. The magnesium battery of claim 1, wherein said electrolyte compound according to Formula (1) is complexed with a Lewis acid compound.

11. The magnesium battery of claim 10, wherein said Lewis acid compound is selected from compounds of aluminum, boron, iron, and titanium.

12. The magnesium battery of claim 11, wherein said Lewis acid compound is selected from AlX$_3$, BX$_3$, PX$_3$, AlX$_2$R$^4$, FeX$_2$, FeX$_3$, SbX$_3$, and TiX$_4$, wherein X is independently selected from halogen atoms, and R$^4$ is a hydrocarbon group having 1 to 3 carbon atoms.

13. The magnesium battery of claim 1, wherein said electrolyte further comprises a polar aprotic solvent nonreactive with components of the magnesium battery.

14. The magnesium battery of claim 13, wherein said polar aprotic solvent includes at least one ether group.

15. The magnesium battery of claim 1, further comprising a solid porous membrane positioned between the negative and positive electrodes.

* * * * *